US011924169B1

United States Patent
Yoskowitz et al.

(10) Patent No.: US 11,924,169 B1
(45) Date of Patent: Mar. 5, 2024

(54) CONFIGURING A SYSTEM FOR SELECTIVELY OBFUSCATING DATA TRANSMITTED BETWEEN SERVERS AND END-USER DEVICES

(71) Applicant: JOINESTY, INC., Deerfield, IL (US)

(72) Inventors: Robert Jeffrey Yoskowitz, Deerfield, IL (US); Stephen Michael Yoskowitz, Chicago, IL (US); Elder Donizetti Dos Santos, Sao Jose dos Campos (BR)

(73) Assignee: JOINESTY, INC., Deerfield, IL (US)

( * ) Notice: Subject to any disclaimer, the term of this patent is extended or adjusted under 35 U.S.C. 154(b) by 316 days.

(21) Appl. No.: 17/333,433

(22) Filed: May 28, 2021

Related U.S. Application Data

(60) Provisional application No. 63/143,382, filed on Jan. 29, 2021.

(51) Int. Cl.
    *G06F 21/00*  (2013.01)
    *H04L 9/40*   (2022.01)

(52) U.S. Cl.
    CPC ...... *H04L 63/0281* (2013.01); *H04L 63/0263* (2013.01); *H04L 63/102* (2013.01); *H04L 63/1425* (2013.01)

(58) Field of Classification Search
    CPC ............. H04L 63/0281; H04L 63/0263; H04L 63/102; H04L 63/1425
    See application file for complete search history.

(56) References Cited

U.S. PATENT DOCUMENTS

| 5,327,534 A | 7/1994 | Hutchison et al. |
| 5,381,479 A | 1/1995 | Gardeck et al. |
| 5,910,906 A | 6/1999 | Schmitt |

(Continued)

FOREIGN PATENT DOCUMENTS

| GB | 2540656 A | 1/2017 |
| WO | WO-2002058357 A2 | 7/2002 |

(Continued)

OTHER PUBLICATIONS

Abdulghani et al "A Study on Security and Privacy Guidelines, Countermeasures, Threats: IoT Data at Rest Perspective," Symmetry, MDPI, pp. 1-36, Jun. 10, 2019 (Year: 2019).

(Continued)

*Primary Examiner* — Michael M Lee
(74) *Attorney, Agent, or Firm* — MARSHALL, GERSTEIN & BORUN LLP

(57) ABSTRACT

Systems and techniques provide activity monitoring and selective obfuscation of various fields or categories of information included in traffic between servers providing services and end-user devices accessing such services. The selective obfuscation may account for a user's role and one or more levels of authorization or permission assigned to such a role. More generally, the disclosed techniques provide the ability to selectively restrict end-user access to data included in server responses, such that desired portions of the data are not accessible while other portions of the data are still accessible. An administrator tool may configure the permissions and rules used to decide whether traffic to or from a particular server or service should be selectively obfuscated; and if so, how that traffic should be selectively obfuscated.

19 Claims, 13 Drawing Sheets

(56) References Cited

U.S. PATENT DOCUMENTS

| | | |
|---|---|---|
| 5,928,333 A | 7/1999 | Landfield et al. |
| 6,085,231 A | 7/2000 | Agraharam et al. |
| 6,115,394 A | 9/2000 | Balachandran et al. |
| 6,161,129 A | 12/2000 | Rochkind |
| 6,173,444 B1 | 1/2001 | Archambault |
| 6,950,983 B1 | 9/2005 | Snavely |
| 7,051,111 B1* | 5/2006 | Scullin ............... H04L 63/0281 725/63 |
| 7,310,772 B2 | 12/2007 | Whitfield |
| 7,406,469 B1 | 7/2008 | Thiyagarajan |
| 7,412,422 B2 | 8/2008 | Shiloh |
| 7,433,710 B2 | 10/2008 | Bodnar et al. |
| 7,747,746 B2 | 6/2010 | Thayer et al. |
| 7,774,484 B1 | 8/2010 | Masters et al. |
| 7,865,613 B2 | 1/2011 | Lerner |
| 8,014,757 B1 | 9/2011 | Lim |
| 8,281,372 B1 | 10/2012 | Vidal |
| 8,316,233 B2 | 11/2012 | Errico |
| 8,374,628 B1 | 2/2013 | Nelissen et al. |
| 8,418,233 B1 | 4/2013 | Hughes |
| 8,516,550 B2 | 8/2013 | Willars et al. |
| 8,566,902 B2 | 10/2013 | Draughon et al. |
| 8,644,847 B1 | 2/2014 | Nelissen et al. |
| 8,700,788 B2 | 4/2014 | Gailey et al. |
| 8,719,952 B1 | 5/2014 | Damm-Goossens |
| 8,738,475 B2 | 5/2014 | Keld |
| 9,270,818 B1 | 2/2016 | Nelissen et al. |
| 9,329,771 B2 | 5/2016 | Fadell et al. |
| 9,473,468 B2 | 10/2016 | Gupta |
| 9,607,041 B2 | 3/2017 | Himmelstein |
| 9,716,788 B2 | 7/2017 | Bendi et al. |
| 9,740,867 B2 | 8/2017 | Nelson et al. |
| 9,846,716 B1 | 12/2017 | Scott et al. |
| 9,876,743 B1 | 1/2018 | Vippagunta |
| 9,911,290 B1 | 3/2018 | Zalewski et al. |
| 9,934,396 B2 | 4/2018 | McReynolds et al. |
| 9,959,694 B2 | 5/2018 | Lindsay |
| 10,069,970 B1 | 9/2018 | Drake et al. |
| 10,148,659 B2 | 12/2018 | Nandakumar |
| 10,474,833 B2 | 11/2019 | Freedman et al. |
| 10,541,981 B1* | 1/2020 | Conley ............... H04W 12/02 |
| 10,600,081 B2 | 3/2020 | Stafford, Jr. et al. |
| 10,614,456 B2 | 4/2020 | Mokhasi |
| 10,645,570 B1 | 5/2020 | Venkatachalam et al. |
| 10,657,061 B1 | 5/2020 | Marriner |
| 10,764,313 B1 | 9/2020 | Mushtaq |
| 10,764,434 B1 | 9/2020 | Yoskowitz et al. |
| 10,834,257 B1 | 11/2020 | Yoskowitz et al. |
| 10,972,501 B2 | 4/2021 | Fugate et al. |
| 10,986,054 B1 | 4/2021 | Yoskowitz et al. |
| 11,005,839 B1 | 5/2021 | Shahidzadeh et al. |
| 11,182,691 B1 | 11/2021 | Zhang |
| 11,296,953 B1 | 4/2022 | Ponnuswamy |
| 11,368,554 B2 | 6/2022 | Long et al. |
| 11,526,859 B1 | 12/2022 | Cousins et al. |
| 11,544,629 B2 | 1/2023 | Koch et al. |
| 2002/0095457 A1 | 7/2002 | Sharma et al. |
| 2002/0136370 A1 | 9/2002 | Gallant |
| 2002/0138743 A1 | 9/2002 | Murakami et al. |
| 2002/0178370 A1 | 11/2002 | Gurevich et al. |
| 2003/0028599 A1 | 2/2003 | Kolsky |
| 2004/0177120 A1 | 9/2004 | Kirsch |
| 2005/0010780 A1 | 1/2005 | Kane et al. |
| 2005/0198173 A1 | 9/2005 | Evans |
| 2006/0026438 A1 | 2/2006 | Stern et al. |
| 2006/0136561 A1 | 6/2006 | Lee |
| 2006/0143136 A1 | 6/2006 | Low et al. |
| 2007/0244977 A1 | 10/2007 | Atkins |
| 2007/0250704 A1 | 10/2007 | Hallam-Baker |
| 2008/0005341 A1 | 1/2008 | Subbian |
| 2008/0008105 A1 | 1/2008 | Black et al. |
| 2008/0045186 A1 | 2/2008 | Black et al. |
| 2008/0052364 A1 | 2/2008 | Zhou |
| 2008/0148366 A1 | 6/2008 | Wahl |
| 2008/0155067 A1* | 6/2008 | Rivera ............... H04L 63/0227 709/227 |
| 2009/0193507 A1 | 7/2009 | Ibrahim |
| 2009/0259725 A1 | 10/2009 | Rabinovich |
| 2010/0017598 A1 | 1/2010 | Rodriguez et al. |
| 2010/0037046 A1 | 2/2010 | Ferg et al. |
| 2010/0042583 A1* | 2/2010 | Gervais ............... G06Q 40/08 707/E17.014 |
| 2011/0295988 A1 | 12/2011 | Le Jouan |
| 2012/0016938 A1 | 1/2012 | Gallant |
| 2012/0036360 A1 | 2/2012 | Bassu et al. |
| 2012/0109882 A1 | 5/2012 | Bouse et al. |
| 2012/0215862 A1 | 8/2012 | Cai et al. |
| 2012/0324020 A1 | 12/2012 | O'Sullivan et al. |
| 2013/0042110 A1 | 2/2013 | Shablygin et al. |
| 2013/0198811 A1 | 8/2013 | Yu et al. |
| 2014/0013451 A1* | 1/2014 | Kulka ............... G06F 21/14 726/29 |
| 2014/0058844 A1 | 2/2014 | Jadeja et al. |
| 2014/0164254 A1 | 6/2014 | Dimmick |
| 2014/0208445 A1 | 7/2014 | DeLuca et al. |
| 2014/0317708 A1 | 10/2014 | Adrangi et al. |
| 2014/0325623 A1 | 10/2014 | Johansson |
| 2014/0344907 A1 | 11/2014 | Wan et al. |
| 2014/0373106 A1 | 12/2014 | Morgenroth |
| 2015/0019858 A1 | 1/2015 | Roth et al. |
| 2015/0249540 A1 | 9/2015 | Khalil et al. |
| 2015/0288676 A1 | 10/2015 | Guo |
| 2015/0341327 A1 | 11/2015 | Barton et al. |
| 2016/0014119 A1 | 1/2016 | Inoue et al. |
| 2016/0119261 A1 | 4/2016 | Ghafourifar et al. |
| 2016/0142536 A1 | 5/2016 | Bendi et al. |
| 2016/0255040 A1 | 9/2016 | Howe |
| 2016/0283740 A1 | 9/2016 | Roundtree |
| 2016/0283920 A1 | 9/2016 | Fisher et al. |
| 2016/0300231 A1 | 10/2016 | Shavell et al. |
| 2016/0314460 A1 | 10/2016 | Subramanian et al. |
| 2017/0024581 A1 | 1/2017 | Grubel et al. |
| 2017/0083486 A1* | 3/2017 | van der Horst ..... H04L 63/0281 |
| 2017/0111337 A1 | 4/2017 | Saboori et al. |
| 2017/0213200 A1 | 7/2017 | Purves |
| 2017/0223046 A1 | 8/2017 | Singh |
| 2017/0237739 A1 | 8/2017 | Nandakumar |
| 2017/0270794 A1 | 9/2017 | Sweeney |
| 2017/0364794 A1 | 12/2017 | Mahkonen et al. |
| 2018/0053182 A1 | 2/2018 | Mokhasi |
| 2018/0165597 A1 | 6/2018 | Jordan et al. |
| 2018/0189824 A1* | 7/2018 | Yanamadala ........... H04L 67/34 |
| 2018/0276398 A1 | 9/2018 | Linton et al. |
| 2019/0037071 A1 | 1/2019 | Singh et al. |
| 2019/0114340 A1 | 4/2019 | Feijoo |
| 2019/0171929 A1 | 6/2019 | Abadi et al. |
| 2019/0190890 A1 | 6/2019 | Druker et al. |
| 2019/0312837 A1 | 10/2019 | McIsaac et al. |
| 2019/0370487 A1 | 12/2019 | Veltman et al. |
| 2019/0372961 A1 | 12/2019 | Circosta et al. |
| 2019/0379654 A1 | 12/2019 | Yoskowitz et al. |
| 2019/0379695 A1 | 12/2019 | Angara et al. |
| 2019/0387025 A1 | 12/2019 | Gummaraju et al. |
| 2020/0007647 A1 | 1/2020 | Castagna et al. |
| 2020/0036682 A1 | 1/2020 | Honma et al. |
| 2020/0050795 A1 | 2/2020 | Solomon et al. |
| 2020/0090182 A1 | 3/2020 | Dimmick |
| 2020/0250340 A1 | 8/2020 | Kodavanji et al. |
| 2020/0382455 A1 | 12/2020 | Fasoli et al. |
| 2020/0382495 A1 | 12/2020 | Belov et al. |
| 2020/0404009 A1 | 12/2020 | Shinomiya et al. |
| 2021/0021518 A1 | 1/2021 | Chand et al. |
| 2021/0021572 A1 | 1/2021 | Bonczar |
| 2021/0034719 A1* | 2/2021 | Brown ............... G06F 21/14 |
| 2021/0051015 A1 | 2/2021 | Widmann et al. |
| 2021/0256309 A1 | 8/2021 | Huth et al. |
| 2022/0021659 A1 | 1/2022 | Goel |
| 2022/0029902 A1 | 1/2022 | Shemer et al. |
| 2022/0058638 A1 | 2/2022 | Edwards et al. |
| 2022/0086174 A1 | 3/2022 | Helmsen et al. |
| 2022/0116411 A1 | 4/2022 | Melicher et al. |
| 2022/0166852 A1 | 5/2022 | Lau |
| 2022/0172101 A1 | 6/2022 | Das et al. |

(56) References Cited

U.S. PATENT DOCUMENTS

| | | | |
|---|---|---|---|
| 2022/0199093 A1 | 6/2022 | Ramadas et al. |
| 2022/0230091 A1 | 7/2022 | Rajasekar |
| 2022/0230115 A1 | 7/2022 | Ray et al. |
| 2022/0239693 A1 | 7/2022 | Livingood |
| 2022/0261864 A1 | 8/2022 | Roberts et al. |
| 2022/0351023 A1 | 11/2022 | Shinde et al. |
| 2022/0366494 A1 | 11/2022 | Cella et al. |
| 2023/0032686 A1 | 2/2023 | Williams et al. |

FOREIGN PATENT DOCUMENTS

| | | |
|---|---|---|
| WO | WO-03050743 A1 | 6/2003 |
| WO | 2005/048544 A1 | 5/2005 |
| WO | WO-2013163652 A3 | 12/2013 |
| WO | 2014/150250 A2 | 9/2014 |
| WO | WO-2015000397 A1 | 1/2015 |

OTHER PUBLICATIONS

Lin et al "Security in Enterprise Networking: A Quick Tour," IEEE Communication Magazine, Jan. 1996, pp. 56-61 (Year: 1996).

Ndibanje et al "Security Analysis and Improvements of Authentication and Access Control in the Internet of Things," Aug. 13, 2014, pp. 14786-14805 (Year: 2014).

Raghavendra et al "Survey on Data Storage and Retrieval Techniques over Encrypted Cloud Data," International Journal of Computer Science and Information Security (IJCSIS), vol. 14, No. 9, Sep. 2016, pp. 718-745 (Year: 2016).

Thomas et al., Data breaches, Phishing, or Malware?: Understanding the risks of stolen credentials, CCS '17: Proceedings of the 2017 ACM SIGSAC Conference on Computer and Communications Security, (2017).

U.S. Appl. No. 63/143,382, Systems and Methods for Implementing Obfuscation Engine, filed Jan. 29, 2021.

U.S. Appl. No. 15/480,314, Apparatus and Method of Automated Email and Password Creation and Curation Across Multiple Websites, filed Apr. 5, 2017.

U.S. Appl. No. 16/773,534, Email Alert for Unauthorized Email, filed Jan. 27, 2020.

U.S. Appl. No. 16/773,593, Phone Alert for Unauthorized Email, filed Jan. 27, 2020.

U.S. Appl. No. 16/773,632, Phone Alert for Unauthorized SMS, filed Jan. 27, 2020.

U.S. Appl. No. 16/773,647, Email Alias Generation, filed Jan. 27, 2020.

U.S. Appl. No. 16/773,668, Phone Number Alias Generation, filed Jan. 27, 2020.

U.S. Appl. No. 16/773,681, Unauthorized Authentication, filed Jan. 27, 2020.

U.S. Appl. No. 16/773,699, Data Integrity Checker, filed Jan. 27, 2020.

U.S. Appl. No. 16/773,709, Data Cycling, filed Jan. 27, 2020.

International Search Report and Written Opinion for PCT/US2017/026224, dated Jul. 10, 2017.

"Answers to your burning questions about how 'Sign in with Apple' works," Web page <https://techcrunch.com/2019/06/07/answers-to-your-burning-questions-about-how-sign-in-withapple-works/>, listed date of Jun. 7, 2019, retrieved from Internet Archive Wayback Machine <https://web.archive.org/web/20190607200205/https://techcrunch.com/2019/06/07/answers-toyour-burning-questions-about-how-sign-in-with-apple-works/> on Aug. 31, 2020.

"Sign in with Apple will come to every iPhone app: How the new privacy login tool works," Web page <https://www.cnet.com/how-to/sign-in-with-apple-will-come-to-every-iphone-app-how-thenew-privacy-login-tool-works/>, listed date of Jun. 6, 2019, retrieved from Internet Archive Wayback machine <https://web.archive.org/web/20190606171348/https://www.cnet.com/howto/sign-in-with-apple-will-come-to-every-iphone-app-how-the-new-privacy-login-tool-works/> on Aug. 31, 2020.

"Sign in with Apple: How it works and how to use it," Web page <https://www.tomsguide.com/news/sign-in-with-apple>, listed date of Jan. 30, 2020, retrieved from Internet Archive Wayback Machine <https://web.archive.org/web/20200130190544/https://www.tomsguide.com/news/sig n-in-withapple> on Aug. 31, 2020.

* cited by examiner

CONFIGURING A SYSTEM FOR SELECTIVELY OBFUSCATING DATA TRANSMITTED BETWEEN SERVERS AND END-USER DEVICES

CROSS-REFERENCE TO RELATED APPLICATIONS

This application claims priority to and the benefit of U.S. Application Ser. No. 63/143,382, filed Jan. 29, 2021 and titled "Systems and Methods for Implementing Obfuscation Engine," the entire disclosure of which is expressly incorporated herein by reference.

TECHNICAL FIELD

The present disclosure generally relates to data security and, in particular, to techniques for selectively obfuscating data traffic between servers and end-user devices.

BACKGROUND

Overall, there has been an explosion of third-party tools geared toward giving access to a company's data across many internal and external individuals. Unfortunately, monitoring the activity of authorized users of these tools is difficult. As a result, organizations often lack visibility into who is viewing, manipulating, or downloading organizational data, opening up the organization to risk and liability of data loss and leakage, not to mention compliance (or non-compliance) issues.

In a typical example, many people both internal and external to an organization need and receive access to organizational data in order to do their job or to provide the services they offer. This is not inherently problematic, but ever more data is being collected as data collection, storage, and analytic techniques improve. Simultaneously, there exists an increasing awareness of, and sensitivity to, the management and accessibility of that data (in no small part due to the growth in global privacy regulations). Data breaches can result in sensitive customer information becoming exposed to bad actors (e.g., resulting in This parallel increase in data availability and concerns about data privacy presents a risky proposition for companies tasked with threading the needle of managing data collection, storage, and distribution without exposing the companies and their customers to undue risk of data breaches, which can compromise customer.

SUMMARY

The described methods and systems enable activity monitoring and selective obfuscation of various fields or categories of information included in traffic between servers providing services and end-user devices accessing such services. The selective obfuscation may account for a user's role and one or more levels of authorization or permission assigned to such a role. More generally, the disclosed techniques provide the ability to selectively restrict end-user access to data included in server responses, such that desired portions of the data are not accessible while other portions of the data are still accessible. For example, in operation, a proxy server implementing an obfuscation engine may receive traffic from a server that is responsive to a request that the obfuscation engine received from an end-user device and forwarded to the server. The obfuscation engine may analyze the traffic using a set of rules to determine whether the traffic includes categories or fields of information that should be obfuscated and to selectively obfuscate the portions of the traffic corresponding to those categories or fields. The proxy server transmits the selectively obfuscated traffic to the end-user device, such that the end-user device understands that the selectively obfuscated traffic is responsive to the original request and such that the end-user device can display the selectively obfuscated traffic. Further, the disclosed techniques provide an administrator tool for configuring which traffic (i.e., traffic from particular servers) should be routed to the obfuscation engine and for defining the rules according to which traffic should be obfuscated. In addition, in some embodiments, a model may be trained using machine learning (ML) techniques to identify certain fields within traffic, and thus enabling the model to identify those fields in traffic (even when not explicitly labeled or identified) for which end-user access should be restricted.

Advantageously, the obfuscation engine can receive and analyze traffic from multiple different servers, each of which may implement a different service and format server responses differently. Using the administrator tool, a system administrator can customize which services should be monitored, which rules should be applied to each service, and which roles (e.g., roles of an organization of the system administrator) should be restricted from accessing certain portions of the traffic. For example, a rule can be defined that obfuscates email addresses (e.g., by replacing an email address with asterisks or an alias), applies to users having a particular role at the organization, and applies to several different (or all) services (e.g., Redash, Salesforce, Hubspot, etc.). Staying with this example, if an end-user device linked to a user having the particular role requests information from any one of these different services, the end-user device will display obfuscated email addresses instead of displaying the actual email addresses (or may simply displaying nothing at all for email fields). Thus, by configuring rules for the obfuscation engine, a system administrator can simultaneously restrict user access to particular types of information arriving from any these different services. Users accessing these services can interact with the services as they normally would (e.g., using a web browser or application for the service), but the information displayed will be the selectively obfuscated traffic. Said another way, the traffic routing functionality and the obfuscation engine functionality described herein may be largely or totally "invisible" to the end-user device. From their perspectives, they might access relevant servers in the same way they normally would. But due to the obfuscation engine and traffic routing tool acting as intermediary nodes between the end-user device and the service, the traffic can be selectively obfuscated in a manner particular to that user's role in the organization. This enables a company, for example, to limit employee access to only viewing or accessing information that is pertinent to that employee's role within the company. Said another way, a user's information, for example, may be limited such that only those who need to view the information to perform job-related functions are allowed to view the information.

In an embodiment, a method for configuring a system that selectively obfuscates data transmitted between servers and end-user devices is provided. The method may include implementing a proxy server that is configured to operate as an intermediary node between one or more servers and an end-user device requesting access to a service. The service may be provided by a given server from the one or more servers. The proxy server may be configured to implement an obfuscation engine to selectively obfuscate at least some data included in traffic sent from the given server to the end-user device based on a set of rules specifying one or more categories of data to be obfuscated. The method may include rendering, at a computing device, a user interface for an administrator tool. The method may include receiving, via the user interface, a requested change to the set of rules. The method may include transmitting the requested change to the proxy server to cause the proxy server to generate an updated set of rules in accordance with the requested change and to thereby change the manner in which the obfuscation engine at the proxy server selectively obfuscates traffic from the server to the end-user device.

In an embodiment, a computing device for configuring a system that selectively obfuscates data transmitted between servers and end-user devices is provided. The computing device may include a communication interface, one or more processors communicatively coupled to the communication interface, and/or one or more memories communicatively coupled to the one or more processors. The communication interface may be configured to communicatively couple to a proxy server that is configured to intercept traffic between one or more servers and an end-user device requesting access to a service from a given server from the one or more servers. The one or more memories may store instructions that, when executed, cause the one or more processors to: (i) render a user interface for an administrator tool; (ii) receive, via the user interface, a requested change to a set of rules utilized by an obfuscation engine implemented at the proxy server to selectively obfuscate at least some data included in traffic sent from the given server to the end-user device, wherein the set of rules specifies one or more categories of data to be obfuscated by the obfuscation engine; and/or (iii) transmit the requested change to the proxy server to cause the proxy server to generate an updated set of rules in accordance with the requested change and to thereby change the manner in which the obfuscation engine at the proxy server selectively obfuscates traffic from the server to the end-user device.

In an embodiment, a selective obfuscation system is provided. The system may include one or more servers, an end-user device, a proxy server, and/or a computing device. The one or more servers may be configured to provide one or more services, wherein each server is configured to provide a different service. The end-user device may be configured to request access to the one or more services. The proxy server may be configured to intercept traffic between at least one of the one or more servers and the end-user device and to implement an obfuscation engine to selectively obfuscate at least some data included in traffic sent from the at least one server to the end-user device based on a set of rules specifying one or more categories of data to be obfuscated. The computing device may be configured to: (i) render a user interface for an administrator tool; (ii) receive, via the user interface, a requested change to the set of rules; and/or (iii) transmit the requested change to the proxy server to cause the proxy server to generate an updated set of rules in accordance with the requested change and to thereby change the manner in which the obfuscation engine at the proxy server selectively obfuscates traffic from the server to the end-user device.

Note, this summary has been provided to introduce a selection of concepts further described below in the detailed description. As explained in the detailed description, certain embodiments may include features and advantages not described in this summary. Similarly, certain embodiments may omit one or more features or advantages described in this summary.

BRIEF DESCRIPTION OF THE DRAWINGS

Each of the figures described below depicts one or more aspects of the disclosed system(s) or method(s), according to an embodiment. The detailed description refers to reference numerals included in the following figures.

DETAILED DESCRIPTION

Figure 1:
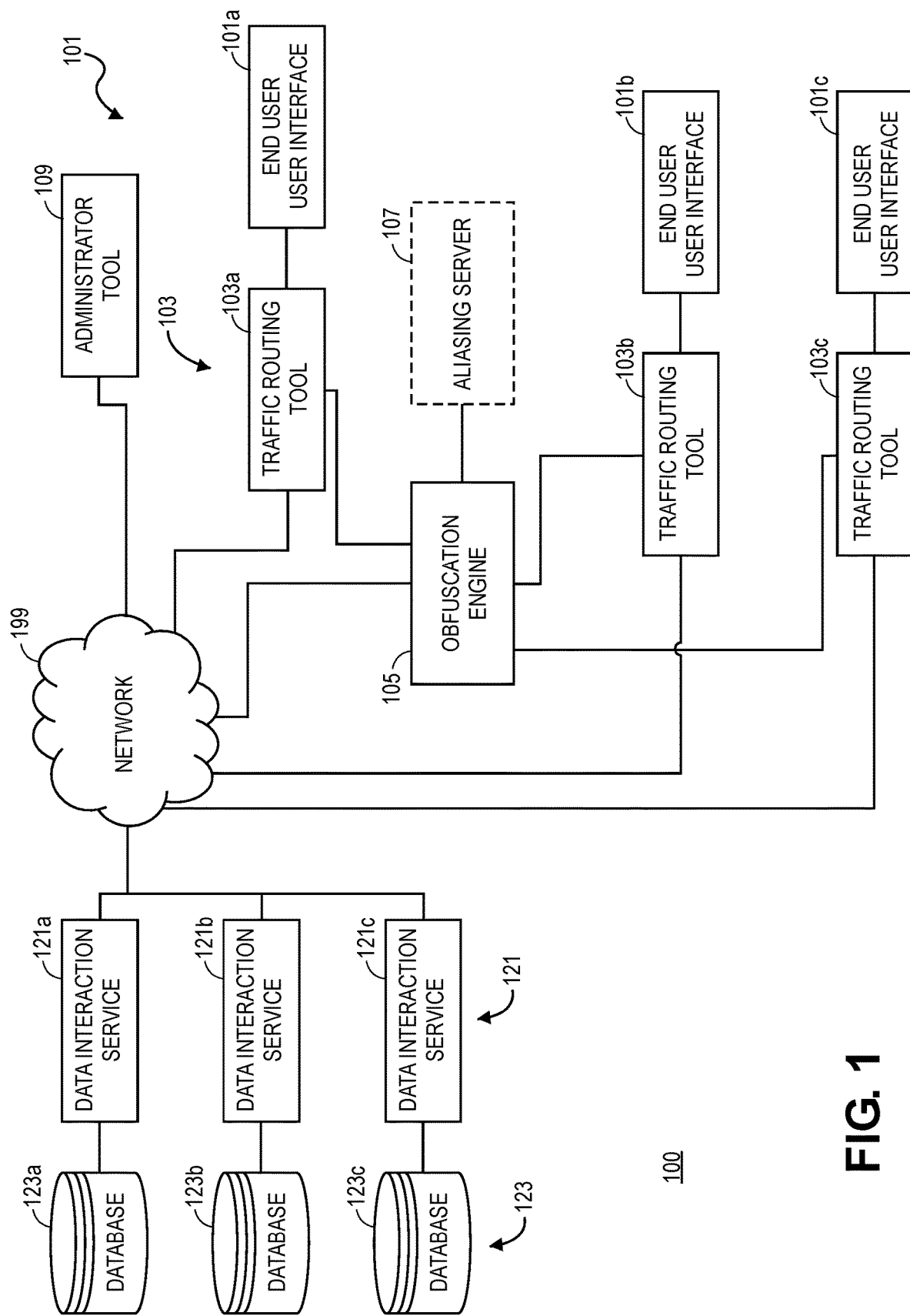
FIG. 1 is a block diagram of an example system for selectively obfuscating traffic between servers and end-user devices.
Figure 6:
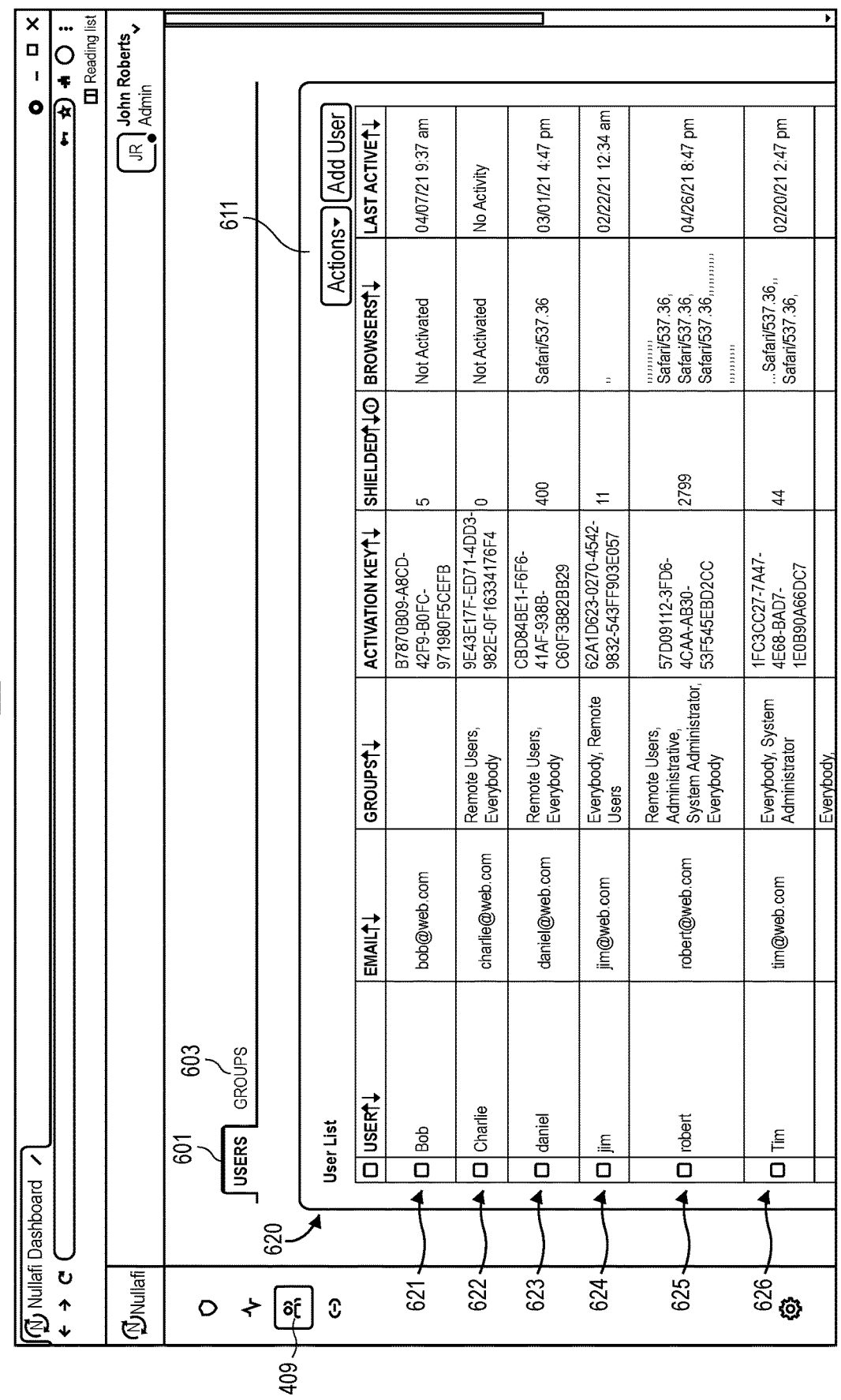
FIG. 6 depicts an example UI of the administrator tool of the example system of FIG. 1, the example UI for viewing a list of users.
Figure 7:
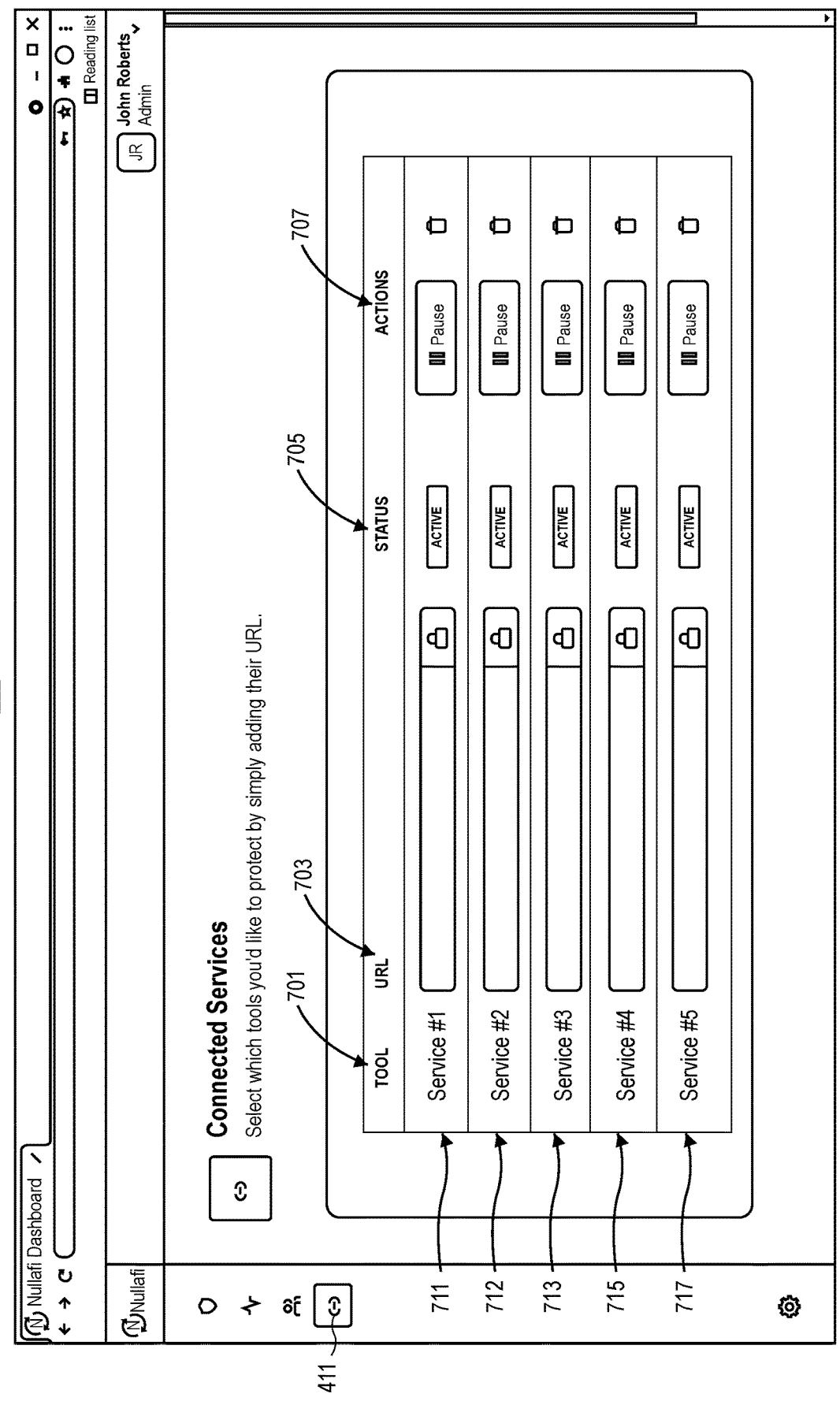
FIG. 7 depicts an example UI of the administrator tool of the example system of FIG. 1, the example UI for configuring a list of data interaction services from which traffic should be obfuscated.
Figure 8A:
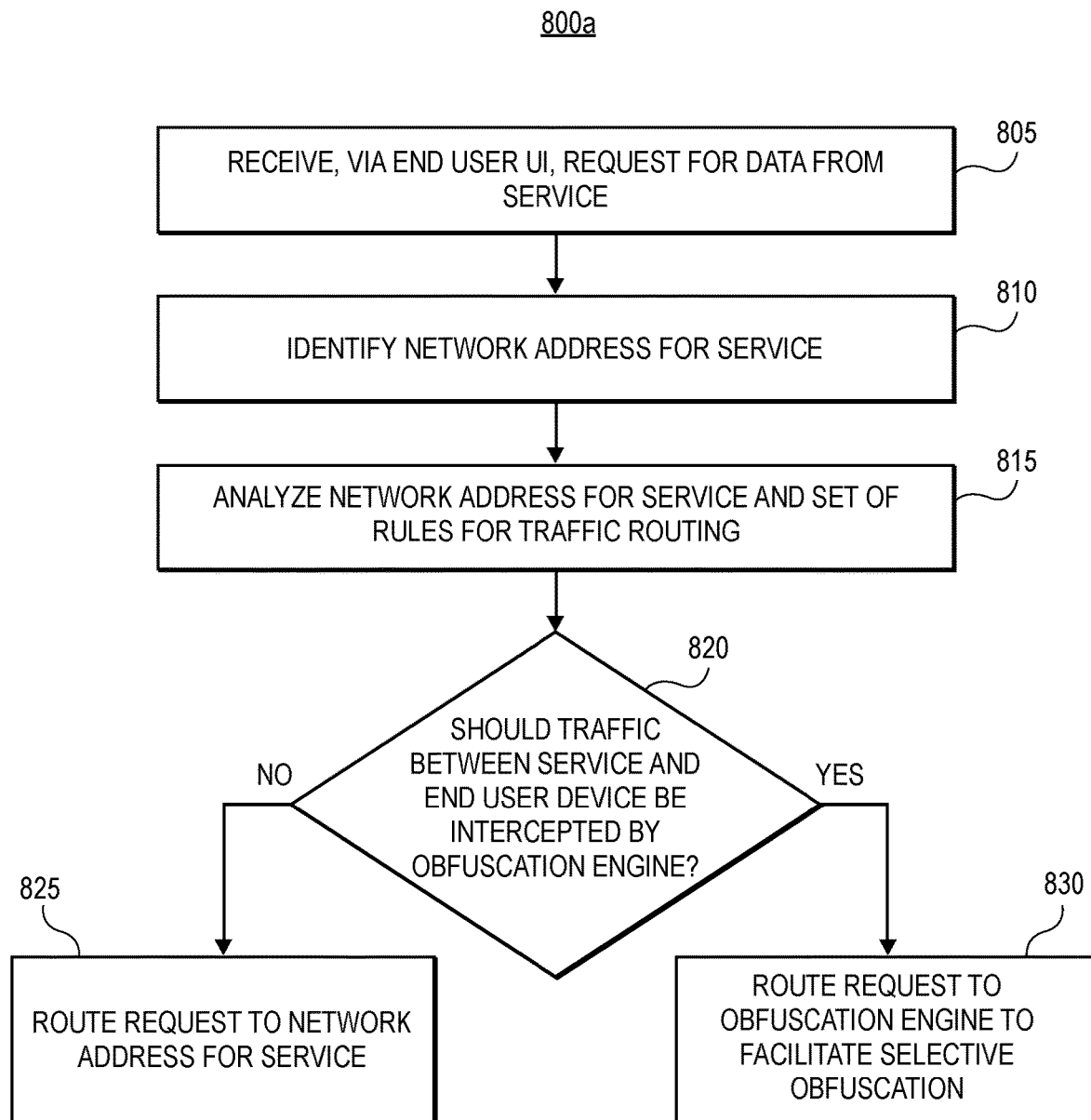
FIG. 8A is a flow diagram of an example method for implementing a traffic routing tool.
Figure 9:
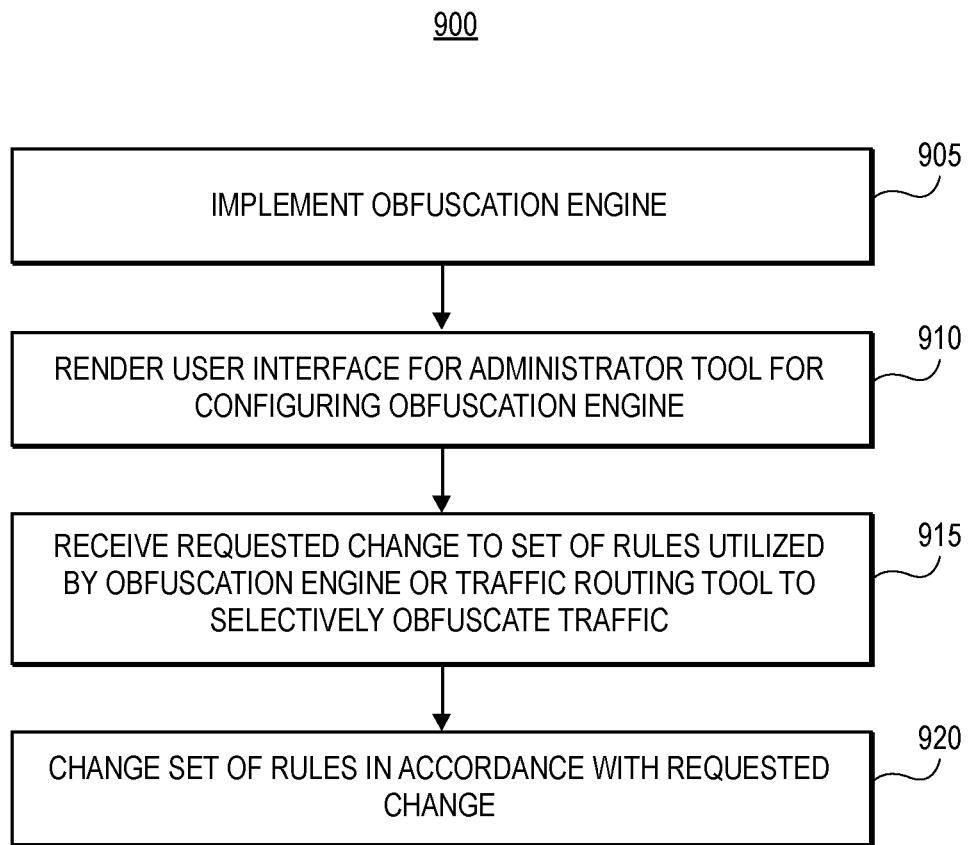
FIG. 9 is a flow diagram of an example method for configuring a system designed to selectively obfuscate traffic, such as the traffic routing tool or the obfuscation tool.
Figure 10:
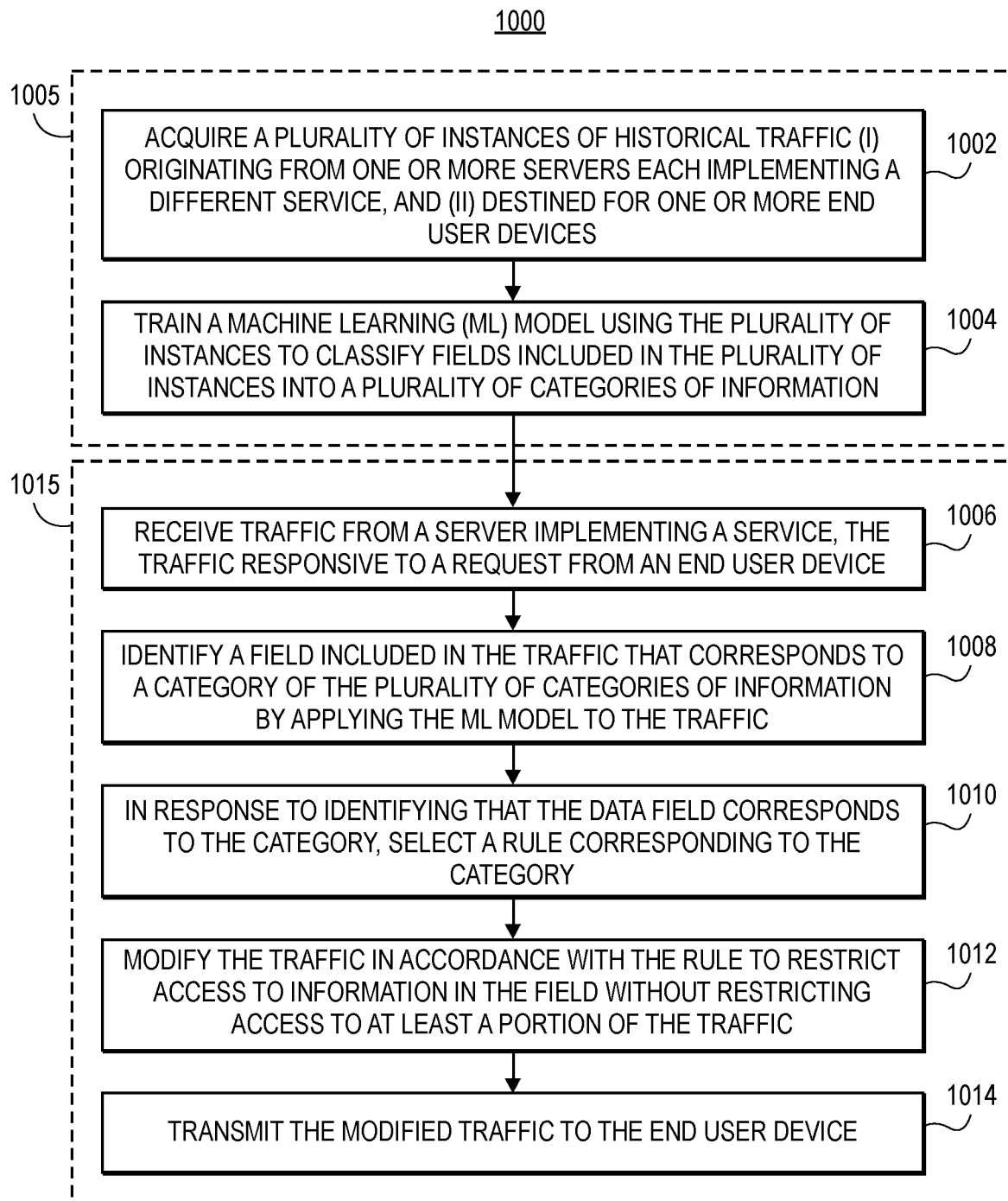
FIG. 10 is a flow diagram of an example method for selectively obfuscating traffic using a machine learning (ML) model.
Figure 11:
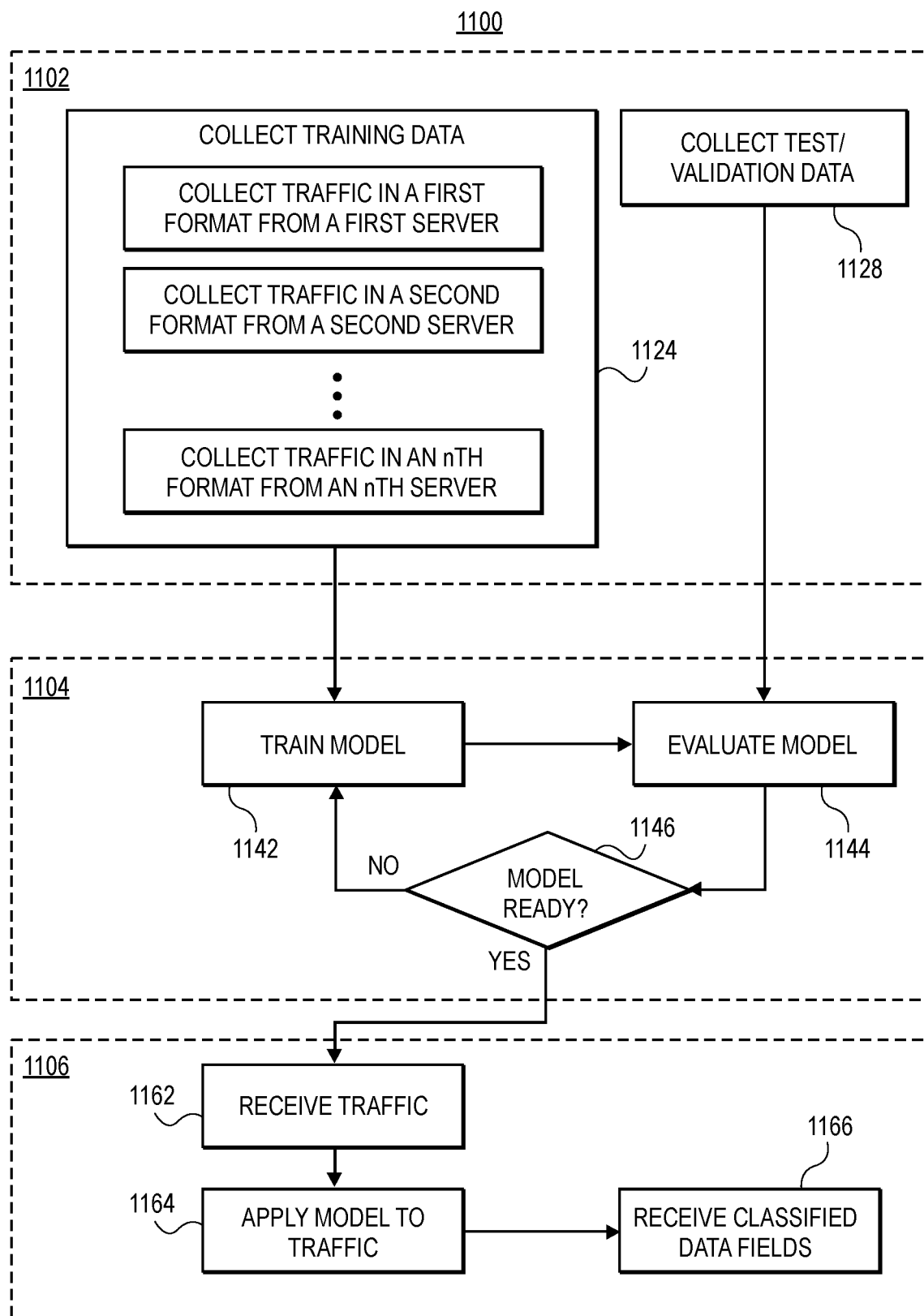
FIG. 11 is a flow diagram of an example method for training, evaluating, and utilizing a ML model for selectively obfuscating traffic.

Various techniques, systems, and methods are discussed below with reference to FIGS. 1-11. FIGS. 1-2B depict example systems and system components according to one or more embodiments; FIG. 3 depicts an example user interface (UI) of a data interaction service, as rendered by an end-user device; FIGS. 4-7 depict example UIs of an administrator tool of one or more of the systems of FIGS. 1-2B; FIGS. 8A-9 depict example methods that may be implemented via one or more of the systems shown in FIGS. 1-2B; and FIGS. 10-11 depict example methods for training and implementing a machine learning (ML) model, in accordance with some embodiments.

As used herein, the phrase "selective obfuscation" (and its variants) refers to a process of parsing a set of information (e.g., information relating to a given entity, such as a customer) to identify one or more subsets of information (e.g., "johndoe@email.com") in the set that should be obfuscated or restricted based on the type, category, or field (e.g., email addresses) to which the subsets of information correspond, such that an end-node (e.g., a device that submitted a request for the set of information) does not receive the one or more subsets and such that the end-node may receive and access information included in the set that is not included in the obfuscated one or more subsets. An obfuscation engine such as that described herein may identify types, categories, or fields of information using various machine learning techniques. If desired, the obfuscation engine(s) may generate and provide to the end-node non-meaningful characters (e.g., "****") in place of the one or more subsets. If desired, the obfuscation engine(s) may generate and provide to the end-node meaningful substitute information in place of the one or more subsets, such as an alias that may or may not be addressable (e.g., "alias1@domain.com"). If desired, the obfuscation engine may provide empty fields or null values in place of the one or more subsets. The selectively obfuscated data may be provided to the end-node in a manner that enables the end-node to determine a field or category to which the one or more subsets correspond. For example, if an "email address" field in the set of information is to be obfuscated, the obfuscation engine may include the "email address" field in the selectively obfuscated traffic and may include an obfuscated value in the field (e.g., "****"). As a result, the end-node and end-user may not only be restricted from viewing or learning the information in question; the end-node and end-user may know what fields have and have not been obfuscated. In some embodiments, the fields may be entirely absent from the selectively obfuscated traffic such that, for example, the end-user is unaware that the obfuscated field (e.g., the email address) was included in the original responsive traffic transmitted by the service. The various obfuscation engines described herein are configured to selectively obfuscate traffic sent between two nodes, such as a node implementing a service (e.g., a customer relationship management or content resource management (CRM) service) and an end-node interacting with the service. A "service" may be thought of as an application or operation implemented at a first computer or node (e.g., at a server) to provide a function for a second computer or node (e.g., at an end-user device). For example, the service may be providing data in response to requests or queries. The services described herein may be implemented as part of any one or more of: a cloud computer platform, a software as a service (SaaS) platform, an infrastructure as a service (IaaS) platform, a platform as a service (PaaS), a desktop as a service (DaaS), a managed software as a service (MSaaS), mobile backend as a service (MBaaS), datacenter as a service (DCaaS), etc.

FIG. 1 is a block diagram of an example system 100 for selectively obfuscating traffic between servers and end-user devices. The system 100 includes (i) one or more end-user user interface(s) (UIs) 101, including end-user UIs 101a-c, (ii) one or more data interaction service(s) 121, including services 121a-121c, (iii) one or more databases 123, including a database 123a utilized by the service 121a, a database 123b utilized by the service 121b, and a database 123c utilized by the service 121c, (iv) one or more traffic routing tool(s) 103, including traffic routing tools 103a-c, and (v) an obfuscation engine 105. Further, the system 100 may also include an aliasing server 107, in some embodiments. The elements of the system 100 may communicate via a network 199. In some embodiments, the system 100 may include any suitable number of databases 123, services 121, engines 105, traffic routing tools 103, or end-user UIs 191. In some embodiments, any one or more of these nodes (e.g., the UIs 101) may communicate with servers or services not shown. For example, the traffic routing tool 103 may route traffic to these other servers or services (in a manner that bypasses the engine 105) when these other servers or services are not identified as services of interest to the tool 103. In other words, traffic between these other servers or services and the UIs 101 may not be selectively obfuscated, if desired.

The end-user UIs 101a-c are UIs (e.g., graphical user interfaces (GUIs)) that may be presented by one or more end-user devices. A user of an end-user device can interact with the data interaction service 121a via the end-user UI 101a, with the data interaction service 121b via the end-user UI 101b, and with the data interaction service 121c via the end-user UI 101c. In some embodiments, any one or more of the UIs 101 may interact with any one or more of the services 121. Each end-user UI 101a-c may be rendered on a different end-user device. Alternatively, one or more of the end-user UIs 101a-c may be UIs of different applications implemented by the same end-user device. For example, the end-user UI 101a may be a UI of a web browser through which the user accesses the data interaction service 121a (e.g., by inputting a uniform resource locators (URL) of the data interaction service 121a into the end-user UI 101a), and the end-user UI 101b may be a UI of a dedicated application of the data interaction service 121b, as will be discussed with reference to FIG. 2A.

The data interaction services 121a-c are services through which end-user devices can access data (e.g., data of an organization associated with the end-user devices). Accordingly, each of the data interaction services 121a-c may be associated with a database 123a-c, respectfully, from which the data interaction services 121a-c can retrieve data and provide the retrieved data to the end-user UIs 101. As mentioned above, a user may interact with the data interaction service 121 by interacting with an end-user UI 101. The data interaction service 121 may be hosted by one or more servers, and may be accessible by the user through a web browser, or through an application of the data interaction service 121. For example, the data interaction service 121 may be a customer relationship management (CRM) service (e.g., Salesforce, Hubspot, Pipedrive, etc.), a financial data service (e.g., an accounting data service such as QuickBooks), or any other web or cloud-based tool which end-user devices access via the network 199. Each of the different data interaction services 121a-c may return data to the end-user device in a different format (e.g., JavaScript Object Notation (JSON), Extensible Markup Language (XML), Hyper Text Markup Language (HTML), Portable Document Format (PDF), Comma-separated values (CSV), text file, etc.), any one of which the obfuscation engine 105 is configured to understand and handle.

In an example scenario in which the obfuscation engine is not utilized, a user may interact with the end-user UI 101 presented by an end-user device to request data from a data interaction service similar to the service 121. The end-user device implementing the UI 101 generates a first message (i.e., a request or a query, such as a Hypertext Transfer Protocol (HTTP) request) based on the user interaction with the end-user UI 101 and transmits the first message to server(s) implementing the data interaction service via the network 199. Based on the first message, the data interaction service retrieves relevant data from a database (e.g., like the database 123), generates a second message (i.e., a response, such as an HTTP response) responsive to the request, and transmits the request to the end-user device via the network 199. The end-user device then renders data included in the response in the end-user UI 101. As used in this disclosure, the term "traffic" may be used to refer to either the first message (i.e., a request from an end-user device) or the second message (i.e., a response from a server to the request). More broadly, the term "traffic" may refer to any traffic between end-user devices implementing UIs such as the UIs 101 and any suitable service such as the services 121.

Compared to the above-described scenario, the system 100 implements traffic routing tools 103a-c and the obfuscation engine 105, which support the techniques of this disclosure (e.g., selective obfuscation of traffic between the services 121 and end-user UIs 101). At a high level, each traffic routing tool 103 and the obfuscation engine 105 implement rules defining whether traffic between an end-user device and a server implementing a data interaction service 121 should be routed through the obfuscation engine (e.g., as opposed to routing traffic directly between the end-user device and service, in a manner similar to the previously described scenario). And, if so, how responses from the server to the end-user device should be obfuscated. Such rules may be configured by the administrator tool 109, which may be implemented by a computing device communicatively coupled to the network 199 (e.g., an end-user device, as discussed with reference to FIGS. 2A-2B).

The administrator tool 109 enables an administrator of a system (e.g., an administrator of a system including end-user devices that display the end-user UIs 101) to configure rules for the system, deploy configured rules to the system, view configured rules, view data activity of users of the system, view/edit user lists, and view/edit groupings of users (e.g., groups of users defined by role). UIs that enable an administrator to interact with the administrator tool are depicted in FIGS. 4-7. After a rule is configured and deployed by the administrator tool 109, the traffic routing tool 103 and the obfuscation engine 105 receive the rule and begin to apply the rule to route and obfuscate traffic, respectively. Rules can be defined for particular data categories, roles, and/or services. Further, a rule may also indicate the level of obfuscation or restriction that should be applied. As an example, a generic rule may be that, "[Role] can see [restriction level] of [data category] within [service]." Thus, an administrator can use the administrator tool 109 to define a specific rule that "[Developers] can see [the last four digits] of [credit card numbers] within [Salesforce]." An administrator can also use the administrator tool 109 to configure exceptions for particular users. Using the example rule mentioned previously, a user "John Smith" may have the role of "Developer," but may be allowed to view unobfuscated credit card numbers by an individual exception.

There may be several levels of obfuscation or restriction configurable via the administrator tool, and the options may vary based on the category of information. For example, one level of obfuscation may be "fully obfuscate," which refers to replacing all of the information for a given field with asterisks or another symbol such that none of the original information is readable. Another level of obfuscation may be obfuscate a portion of the information. How the information is obfuscated may depend on the category. In the case of an email address category, obfuscating a portion of the information may include obfuscating the username and retaining the domain name (e.g., johnsmith@domain.com may be obfuscated to *********@domain.com). In the case of a credit card number, obfuscating a portion of the information may include obfuscating all but the last four digits of the credit card number. Still further, another level of obfuscation may be to replace the information with an alias for the information, as will be described below with reference to the aliasing server 107. Another level of restriction may be to remove all or a portion of the information from the field, which may be combined with the obfuscation techniques described above.

In some implementations, the system 100 includes the aliasing server 107, which is configured to generate aliases. In some embodiments, obfuscating a set of information for a given field may include the obfuscation engine 105 communicating with the aliasing server 107 to cause the aliasing server 107 to generate an alias for the set of information. The aliasing server 107 may provide the alias to the obfuscation engine 105, which may provide the alias to the end-user device in place of the original set of information.

To illustrate the obfuscation engine 105 may request or retrieve aliases from the aliasing server 107 in response to determining that information in a field should be replaced with an alias (e.g., in response to determine that the rules stipulate use of the alias). The aliasing server 107 may generate an alias based on the category of information to which the field corresponds and/or on the information itself. For example, if the category of information is "name," the alias may be generated to resemble a name (e.g., to have the same format as a name). Further, the alias may be unique for the information, and therefore the aliasing server 107 can later retrieve the "real" information using an alias map that maps generated aliases back to the corresponding information. Moreover, in the case of categories intended to include addressable information, such as an email address, a telephone address, a network address (e.g., an internet protocol (IP) address), or a hardware address (e.g., a media access control (MAC) address) (collectively referred to as telecommunication (telecom) addresses), the generated alias may be a functional address that subsequently functions as an intermediary address associated with the aliasing server 107, where the aliasing server 107 is configured to route messages (e.g., phone calls, text messages, emails) between aliases and the user's "real" address linked to the aliases. Thus, after an alias is generated, the aliasing server 107 may function as a "middle man," receiving messages directed to the alias and forwarding the messages to the appropriate telecom address. An alias telecom address of a contact can therefore be provided to a user such that, if the user attempts to send a message to the telecom address, the messages can reach the desired contact via the aliasing server 107, without the user knowing the actual telecom address. In some instances, the obfuscation engine 105 and the aliasing server 107 are implemented on the same device. In some instances, they are implemented on different devices or servers.

In any event, the traffic routing tool 103 is configured to intercept a request, generated by an end-user device implementing one of the UIs 101, based on a user interaction with the end-user UI 101 prior to the request reaching the data interaction service 121. As will be discussed in further detail with reference to FIGS. 2A-2B, the traffic routing tool 103 may be implemented on the end-user device itself, or on another server (e.g., a proxy server) that operates as an intermediary between the end-user device and the server(s) implementing the data interaction service 121. As one example, the traffic routing tool 103 may be implemented as a widget or plug-in of a web browser operating on the end-user device. As another example, the traffic routing tool 103 may be implemented as part of an application executing on the end-user device or as a plug-in for an application (e.g., as a plug-in for an application via which an end-user device accesses the data interaction service 121). As a further example, the traffic routing tool 103 may be implemented on a proxy server that routes traffic between the end-user device and the server(s) implementing the data interaction service 121. After intercepting the request, the traffic routing tool 103 analyzes the request to determine whether the intended recipient of the request is indicated by any deployed rules. For example, the traffic routing tool 103 can determine that a destination URL for the request is indicated by one or more rules, or, more generally, that a destination server for the request is indicated by one or more rules. If so, then the traffic routing tool 103 transmits the request to the obfuscation engine 105. Otherwise, the traffic routing tool 103 transmits the request to the data interaction service 121, bypassing the obfuscation engine 105.

The obfuscation engine 105 may be implemented by a proxy server (which may also implement the traffic routing tool 103). After receiving the request from the traffic routing tool 103, the proxy server transmits the request to the appropriate data interaction service 121. More particularly, the proxy server passes the request to the data interaction service 121, such that the data interaction service 121 transmits the response to the proxy server rather than directly to the end-user device. After the proxy server receives the response, the obfuscation engine 105 processes the response in accordance with the deployed rules. The obfuscation engine 105 selects the rules that (i) apply for the particular data interaction service 121 from which the response was received and/or (ii) apply to the role linked with the end-user device. The obfuscation engine 105 then applies the selected rules to the response to obfuscate or otherwise restrict access to the categories indicated in the rules.

As an illustration, after receiving a response, the obfuscation engine 105 may examine the response to determine the role of the user linked with the end-user device to which the response is addressed. For example, if the request originated from the UI 101a, the role (or a unique identifier linked to the role) may be passed to the obfuscation engine 105 from the traffic routing tool 103a. The role may be linked to log-in credentials (e.g., username and/or password) entered by a user of the end-user device implementing the UI 101a. In an embodiment, the role may be linked to a device ID for the end-user device. In any event, if desired, the obfuscation engine 105 is configured to determine a role associated with a request or traffic responsive to a request.

The obfuscation engine 105 may determine whether there are any rules applicable to the responsive traffic (e.g., by evaluating the rules to determine what, if any, permissions are assigned to the given user and/or given service). A given rule may be particular to a service 121, to a subset of the services 121, or to all of the services 121. For example, a rule may stipulate that a "sales" role should not view information in a "credit card number" field, regardless of the service providing the "credit card number." In an embodiment, a rule may stipulate that the "sales" role can view credit information from the service 121a but not from the service 121b. If desired, a rule may be particular to a role, a subset of roles, or all roles. For example, a rule may forbid all roles from viewing information in a "social security number" field. In another example, such a rule may apply to some roles but not others.

In any event, in some instances, the obfuscation engine 105 may check whether or not any individual exceptions for the particular user exist for those rules. For example, a given role (e.g., "Information Technology") may not be permitted to view a certain field (e.g., phone numbers), but an individual user may have an exception that permits him to view the certain field. In addition, the obfuscation engine 105 may analyze the response to classify the data in the response, thereby identifying fields or categories included in the response. The obfuscation engine 105 may then determine how these identified categories or fields correspond to the categories or fields indicated by the rules. The obfuscation engine 105 may determine that one or more categories or fields in the traffic match one or more categories or fields that should be obfuscated (or for which access should otherwise be restricted) according to the rules. In response to making this determination, the obfuscation engine 105 obfuscates, or restricts access to, the information in the identified fields in accordance with the rules. If there are no fields corresponding to the categories indicated by the roles, then the obfuscation engine 105 may leave the response unmodified. The obfuscation engine 105 then forwards the modified (or unmodified) response to the end-user device.

After receiving the response from the obfuscation engine 105, the end-user device displays the data in the response via the end-user UI 101. The end-user UI 101 may behave "normally," i.e., as it would have had the response been received directly from the data interaction service 121 and not via the obfuscation engine 105. For fields that have been obfuscated or otherwise modified by the obfuscation engine 105, the end-user UI 101 displays the modified information (e.g., in the johnsmith@domain.com example discussed above, the end-user UI 101 would display *********@domain.com under the email address field rather than johnsmith@domain.com). An example end-user UI 101 including obfuscated information is illustrated in FIG. 3.

In some implementations, the system 100 may include multiple obfuscation engines 105. For example, a first obfuscation engine 105 may be implemented on a server associated with a first organization, where the first organization is associated with a first group of end-user devices. A second obfuscation engine 105 may be implemented on a server associated with a second organization, where the second organization is associated with a second group of end-user devices. Accordingly, each organization may have an administrator tool 109 to configure rules for the corresponding obfuscation engine 105. Additionally or alternatively, multiple organizations may selectively route traffic to the obfuscation engine 105, such that a single obfuscation engine handles traffic for multiple organizations and their employees.

The network 199 is a telecommunications network including a set of nodes (e.g., devices or systems capable of sending, receiving or forwarding information) and links which are connected to enable telecommunication between the nodes, wherein the nodes are computing devices configured to exchange data with one or more of the other nodes in the network 199. The data network 199 may include dedicated routers, switches, or hubs responsible for forwarding or directing traffic between nodes, and, optionally, dedicated devices responsible for configuring and managing the network 199. Some or all of the nodes may be also adapted to function as routers in order to direct traffic sent between other nodes. The nodes may be inter-connected in a wired or wireless manner, and may have different routing and transfer capabilities. The links between nodes in the network 199 may have different throughput capabilities and different attenuation characteristics. A fiber optic cable, for example, may be capable of providing a bandwidth several orders of magnitude higher than a wireless link because of the difference in the inherent physical limitations of the medium. The network 199 may include networks or sub-networks, such as a local area network (LAN) or a wide area network (WAN) (e.g., the Internet). Any one or more of the computing devices or tools (or, more particularly, the devices which implement the tools/services) discussed with reference to FIG. 1 (i.e., elements 101, 103, 105, 107, 109, 121, and 123), and may be coupled to the network 199 via a link that enables data transmission. The network 199 may be or include a network utilizing one or more protocols from the Internet protocol suite (e.g., transmission control protocol (TCP)/IP).

Figure 2A:
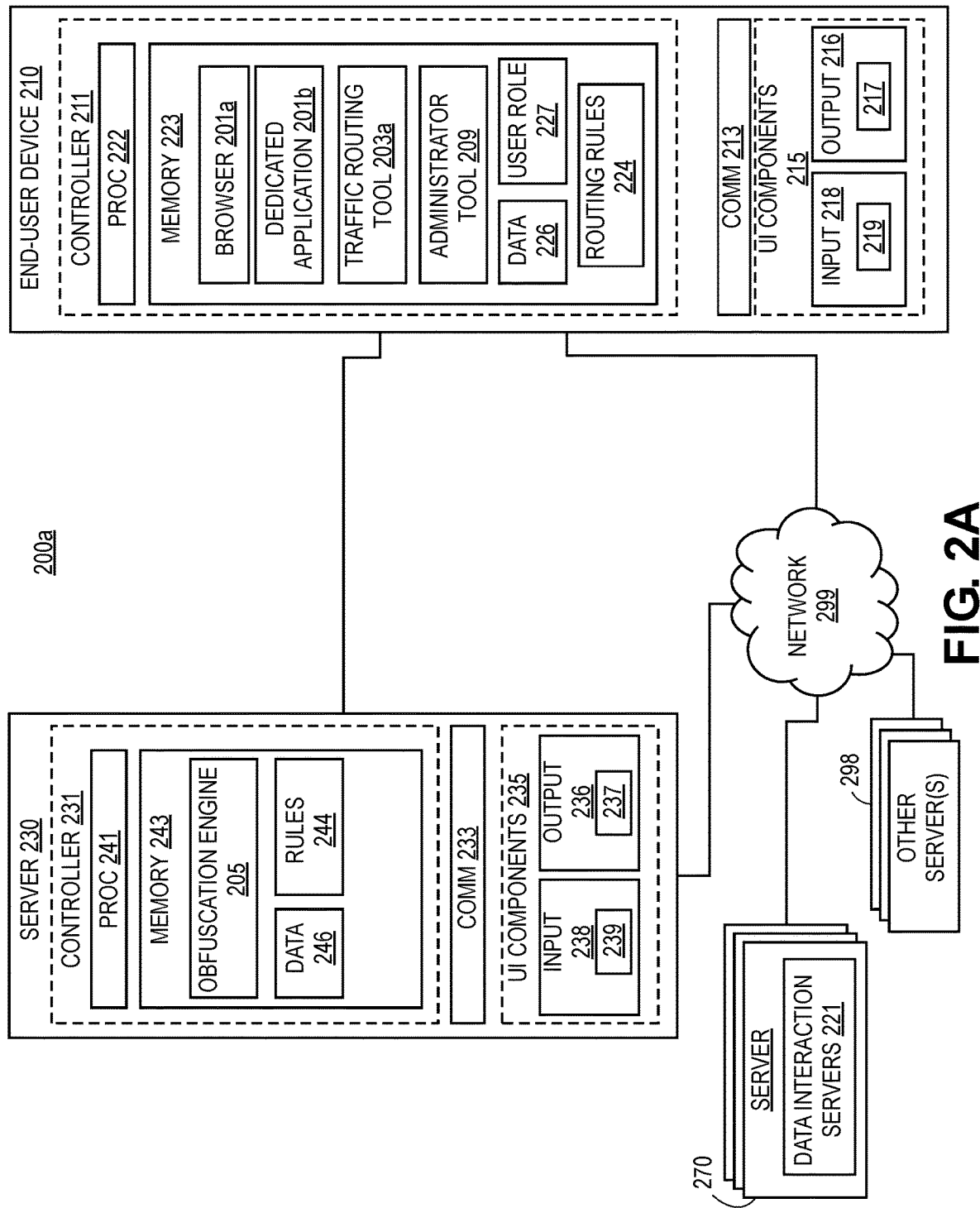
FIG. 2A is a block diagram of hardware components of an end-user device and a server implementing an obfuscation engine, according to one embodiment.
Figure 2B:
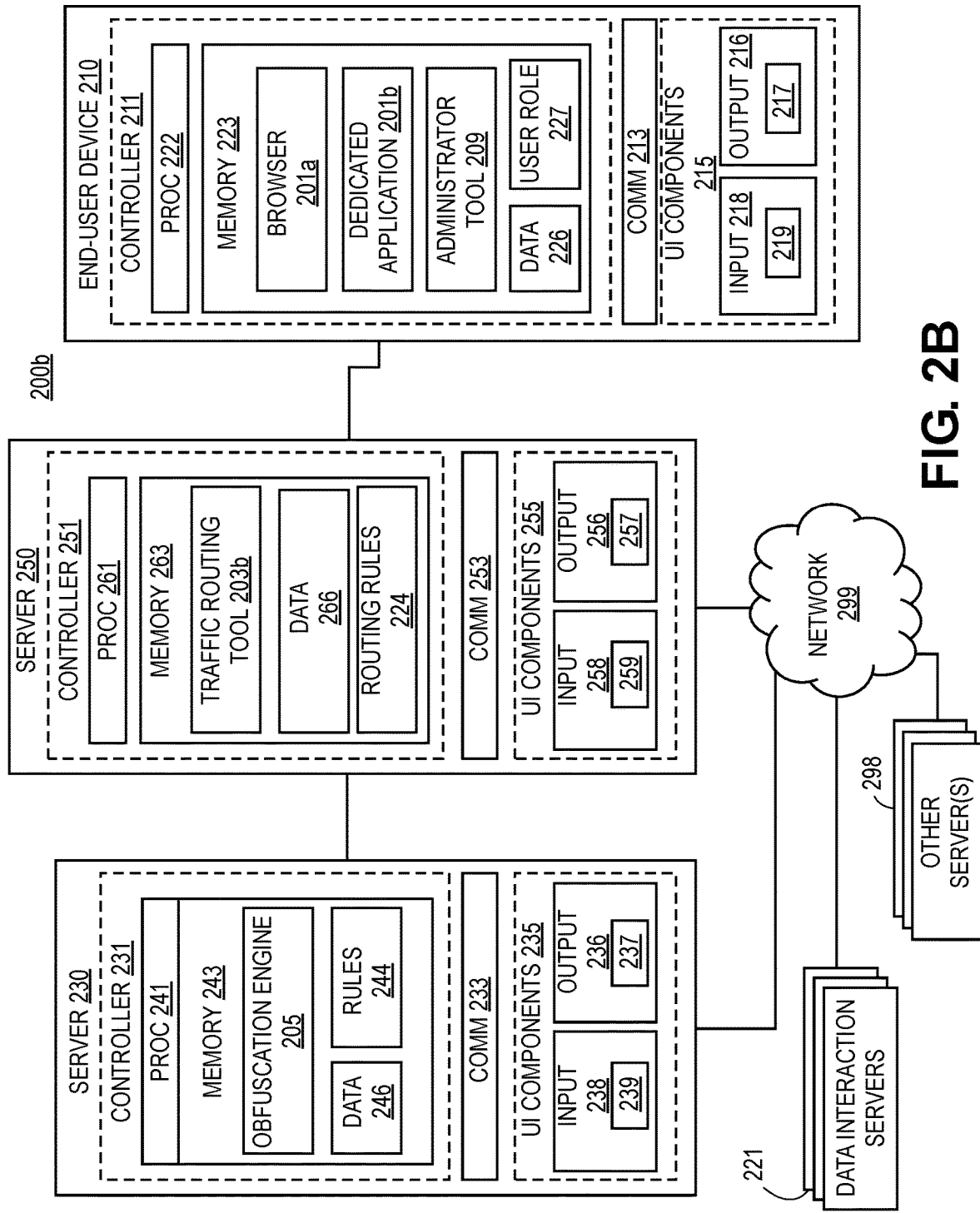
FIG. 2B is a block diagram of hardware components of an end-user device, a server implementing a traffic routing tool, and a server implementing an obfuscation engine, according to one embodiment.
Figure 3:
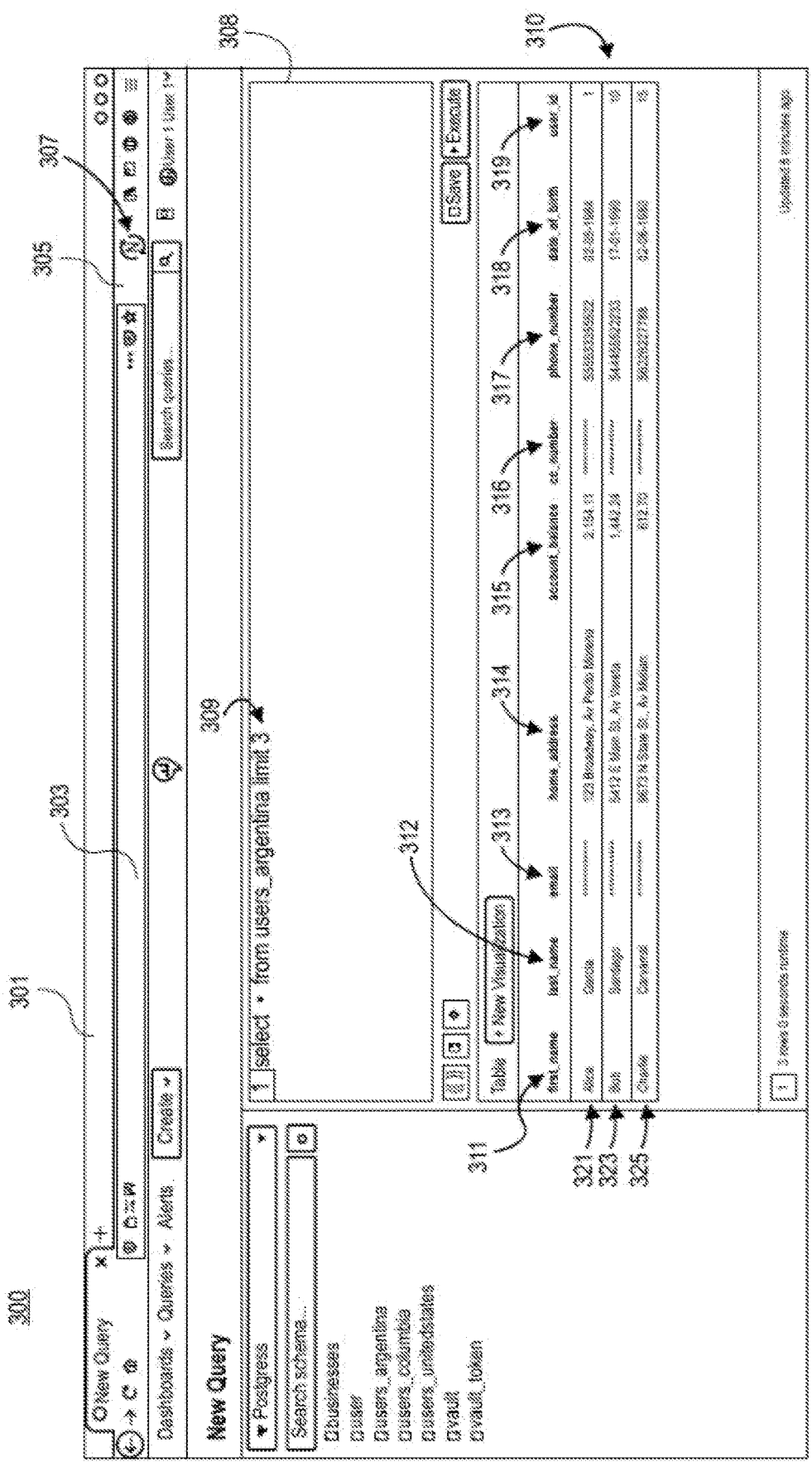
FIG. 3 depicts an example user interface (UI) of a data interaction service, which may be rendered by an end-user device.

FIG. 2A is a block diagram of hardware components 200A of an end-user device 210 and a server 230 implementing an obfuscation engine 205, which represents an embodiment of the obfuscation engine 105 described with reference to FIG. 1 and may have the same or similar functionality. Generally speaking, the hardware components 200A may be included in the system 100, described above. The end-user device 210 and the server 230 can communicate with each other and with external servers via a network 299, which may be similar to the network 199. The external servers may include servers of the data interaction service(s) 221, which may be the data interaction service(s) 121, and other server(s) 298 supporting other services that the end-user device 210 may access.

The end-user device 210 is a computing device such as a mobile phone, tablet, laptop, desktop, etc.). The end-user device 210 may include: (i) a controller 211 including a processor 222 and a memory 223 coupled to the processor 222 (e.g., via a bus—not shown), where the memory 223 can store machine-readable instructions executable on the processor 222; (ii) a communication interface 213 coupled to the controller 211 (e.g., via the bus); and (iii) a set of UI components 215 coupled to the controller 211 (e.g., via the bus), including one or more output UI components 216 and one or more input UI components 218. The controller 211 may be configured to implement the functions attributed herein to the UIs 101, the administrator tool 109, and/or the traffic routing tool 103 shown in FIG. 1 (e.g., by executing instructions stored to the memory 223). The one or more UI output components 216 may include an electronic display 217 (e.g., a liquid crystal display (LCD) display), and the one or more UI input components 218 may include touch sensors 219 integrated within the display 217 (or any other suitable input device or component) for detecting user input. The components of the end-user device 210 may be disposed within or throughout a housing of the end-user device 210. In an embodiment, the hardware components 200A include multiple end-user devices similar to the end-user device 210.

The memory 223 may store UIs 201 which may be similar to the UIs 101 shown in FIG. 1 and which may provide the same or similar functionality as provided by the UIs 101. Specifically, as shown, the memory 223 includes a web browser 201a, which may correspond to the end-user UI 101a, and a dedicated application 201b, which may correspond to the end-user UI 101b. The dedicated application 201b may be a dedicated application (e.g., a mobile app) for a data interaction service (e.g., the data interaction service 121(b). By interacting with UIs of the browser 201a (e.g., the end-user UI 101a) or the dedicated application 201b (e.g., the end-user UI 101b), the user causes the end-user device 210 to generate requests for data interaction service(s) 221.

The memory 223 also stores a traffic routing tool 203a, which may be similar to the traffic routing tool 103 and may provide the same or similar functionality as the tool 103. The traffic routing tool 103 may operate as a widget for the browser 201a. Thus, requests made via the browser 201a may be intercepted by the traffic routing tool 203a. Alternatively or additionally, the traffic routing tool 103 may be implemented as a plug-in, add-on, or module for or of the dedicated application 201b, such that requests made via the dedicated application 201b may be intercepted by the traffic routing tool 203a. In other implementations, the traffic routing tool 103 may be implemented as a module on the end-user device 210 outside the browser 201a and the dedicated application 201b, and may intercept requests from the browser 201a and/or the dedicated application 201b. In some embodiments, the traffic routing tool 203 is configured to intercept all traffic transmitted by the device 210 and to route traffic accordingly. The memory 223 may store routing rules 224, which the traffic routing tool 203a uses to determine whether or not to route traffic to the server 230, which implements an obfuscation engine 205. The routing rules 224 may be configured using an administrator tool 209. The routing rules 224 may indicate that traffic from the data interaction service(s) 221 should be obfuscated, while traffic from other server(s) is not to be obfuscated.

If the traffic routing tool 203a receives a request from the end-user device 210 and determines that the request is to a service indicated by the routing rules 224 (i.e., to the data interaction service(s) 221), then the traffic routing tool 203a routes the request to the server 230 to enable selective obfuscation by the obfuscation engine 205. Otherwise, the traffic routing tool 203a routes the request to the other server(s) 298, bypassing the server 230 and the obfuscation engine 205.

In addition, the memory 223 may also store an administrator tool 209, which may be similar to the administrator tool 109 and may provide the same or similar functions. A user may access the administrator tool 209 by providing an identification of an administrator and authenticating themselves as the administrator (e.g., by providing one or more credentials that match with the identification).

The memory 223 also stores a set of data 226, which may include input data or output data utilized by the applications/tools 201a, 201b, 203a, 209, or other data utilized by other routines (not shown) implemented by the end-user device 210. For example, the data 226 may include data that the end-user device 210 receives from external servers (e.g., the data interaction service(s) 221 or the other server(s) 298). Further, the memory 223 may also store an identification 227 of a user role, where the user role is a role (e.g., for an organization) of a user that is associated with the end-user device 210. The identification 227 of the user role may be retrieved by the end-user device 210 in response to a user identifying and authenticating themselves as a particular user.

The server 230 may include: (i) a controller 231 including a processor 241 and a memory 243 coupled to the processor (e.g., via a bus), where the memory 243 can store machine-readable instructions executable by the processor 241; (ii) a communication interface 233 coupled to the controller 231 (e.g., via the bus); and (iii) a set of UI components 235 coupled to the controller 231 (e.g., via the bus), including one or more UI output components 236 and one or more UI input components 238. The controller 231 may be configured to implement the functions attributed herein to the obfuscation engine 105 shown in FIG. 1 or to the obfuscation engine 205 (e.g., by executing instructions stored to the memory 223). The one or more UI output components 236 may include an electronic display 237 (e.g., an LCD display), and the one or more UI input components 238 may include a keyboard 239 or any other suitable input device for detecting user input. In an embodiment, the described functionality provided by the server 230 may be provided by any suitable number of servers 230. That is, in some embodiments, the server 230 may be implemented as a distributed system including, e.g., any desired number of computers, servers, databases, local or remote memories, etc. The components of the server 230 may be disposed within or throughout a housing of the server 230.

The memory 243 may store the obfuscation engine 205, which may be similar to the obfuscation engine 105, and obfuscation rules 244 that the obfuscation engine 205 applies to traffic received from the data interaction service(s) 221 and destined for the end-user device 210. The obfuscation rules 244 may be configured by the administrator tool 209. The rules 244 may specify permissions or authorizations for particular types or categories of information (e.g., corresponding to fields for data in the databases 123). In an example implementation, the permissions agnostic to the service being accessed and are dependent on a user's role such that a first set or subset of rules exists for a first role and a second set or subset of rules exists for a second role. In such an implementation, a permission for a given field for a given user will be the same regardless of the service (e.g., credit card information may always be obfuscated or restricted for a first role regardless of the service being accessed). In some implementations, the permissions may be dependent multiple factors, such as the service being accessed, the role of the user requesting access, the identity of the unique user requesting the access, etc. In such implementations, an administrator may define (e.g., via the administrator tool 109/209) priorities or an order of operation for evaluating permissions. For example, a first level of permissions may exist for a service, but role based permissions may override service level permissions if a conflict exists. It may be helpful to establish service level permissions in case a user has not been assigned a role for some reason. As an additional example, user-level permissions may override service level and role level permissions. In any event, the an administrator may define the priorities or order of operation of permissions in any suitable manner.

In any event, the server 230 passes requests received from the end-user device 210 to the destination data interaction service 221. The data interaction service 221 then transmits a response to the request to the server 230, which processes the request using the obfuscation engine 205, and forwards the request, which may be modified by the obfuscation engine 205, to the end-user device 210.

The memory 243 may also store a set of data 246, which may include input data or output data utilized by the obfuscation engine 205, or other data utilized by other routines (not shown) implemented by the server 230. For example, the data 246 may include data that the server 230 receives from the end-user device 210 or external servers (e.g., the data interaction service(s) 221 or the other server(s) 298).

FIG. 2B is a block diagram of hardware components 200B, which may implement the system 100 in an alternative manner to the hardware components 200A. The hardware components 200B include the end-user device 210 and the server 230. However, in contrast to the traffic routing tool 203a, which is implemented on the end-user device 210, a traffic routing tool 203b is implemented on a server 250. Accordingly, in FIG. 2B, the end-user device 210 does not include a traffic routing tool or routing rules. Instead, all traffic from the end-user device 210 is received at the server 250. The server 250, for example, may be a proxy server for an organization associated with the end-user device 210, wherein all devices in the organization's network are routed through the proxy server before reaching outside networks. The traffic routing tool 203b applies the routing rules 224 to the traffic to determine whether the traffic should be transmitted to the server 230, such that responses are obfuscated by the obfuscation engine 205. If so, then the traffic routing tool 203b routes the traffic to the server 230. Otherwise, the traffic routing tool 203b routes the traffic to the other server(s) 298, bypassing the server 230 and the obfuscation engine 205. The server 230 receives requests from the server 250, passes the requests to the appropriate data interaction service(s) 221, and receives responses to the requests from the data interaction services(s) 221. After obfuscating the response using the obfuscation engine 205, the server 230 forwards the responses to the server 250, which in turn transmits the responses to the end-user device 210.

The server 250 may be generally similar to the server 230. More particularly, the server 250 may include a controller 251, a processor 261, a memory 263, a communication interface 253, a set of UI components 255, one or more output components 256 (e.g., including an electronic display 257), and one or more UI input components 258 (e.g., including a keyboard 259 or other suitable input device). The memory 263 may store the traffic routing tool 203b and the routing rules 224, as discussed above, and the controller 251 may be configured to implement the traffic routing tool 203b (e.g., by way of the processor 261 executing instructions corresponding to the tool 203b). The memory 263 may also store a set of data 266, which may include input data or output data utilized by the traffic routing tool 203b, or other data utilized by other routines (not shown) implemented by the server 250. For example, the data 266 may include data that the server 250 receives from the end-user device 210, the server 230, or external servers (e.g., the data interaction service(s) 221 or the other server(s) 298). In an embodiment, the described functionality provided by the server 250 may be provided by any suitable number of servers 250. That is, in some embodiments, the server 250 may be implemented as a distributed system including, e.g., any desired number of computers, servers, databases, local or remote memories, etc. The components of the server 250 may be disposed within or throughout a housing of the server 250.

As noted above, each of the devices 210, 230, and 250 in FIGS. 2A-2B may include a bus. Generally speaking, a bus is a communication system that transfers information between components inside a computer system, or between computer systems. Each reference to a "bus" may refer to a data bus (for carrying data), an address bus (for determining where the data should be sent), a control bus (for determining the operation to execute), or some combination thereof. Further, when the functionality attributed to any of the devices 210, 230, or 250 is implemented by a plurality of devices, the plurality of devices may communicate with each other via any suitable network communication standards or protocols.

FIG. 3 depicts an example user interface (UI) 300 of a data interaction service, which may be rendered by an end-user device (such as the device 210 shown in FIGS. 2A and 2B) implementing an end-user UI (such as the UIs 101 and 201 shown in FIGS. 1-2B.). The UI 300 may be rendered via a browser application, and may include a window 301 including an address bar 303 and a plug-in area 305 including an icon 307 for activating or deactivating one of the described traffic routing tools (e.g., 103, 203).

A user of the UI 300 may access the website and UI 300 associated with a service of interest, such as the service 121a, by entering the appropriate URL for the service 121a in the address bar 303. From the user's perspective, the UI 300 appears the same or nearly the same regardless of whether or not the traffic routing tool has been activated (e.g., via the icon 307), aside from the fact that some data may be obfuscated when the traffic routing tool is active. In some instances, a user's permissions are such that he or she cannot de-activate the traffic routing tool. For example, the icon 307 may indicate that the traffic routing tool is active, but a user may not be permitted to deactivate the traffic routing tool via interaction with the icon 307.

The window 301 includes an area 308 for entering queries for data, such as a query 309, which may be transmitted to the service 121 corresponding to the UI 300. A user may input any suitable query into the area 308. In response to the query, the service 121 may transmit responsive traffic that is routed through the obfuscation engine 105. As shown, the response to the query or request may be displayed in an area 310. The response may be selectively obfuscated traffic that has been handled and transmitted by the obfuscation engine 105 to the device 101 implementing the UI 300.

As shown, the received response to the query or request 309 includes fields 311-319 for three different entities 321-325. Each field 311-319 includes a value or set of information for each entity. As shown, the set of rules utilized by the obfuscation engine 105 indicate that the user of the UI 300 is not authorized to view information included in the email field 313 or in the cc-number field 316 (e.g., because the a service level rule does not permit users to view those fields, because a role-level rule does not permit users to view those fields, and/or because a user-level rule does not permit the user to view those fields). As a result, the obfuscation engine has transmitted obfuscated values (e.g., a string of asterisks) for each of these fields for each entity 321-325. Note, when the engine 105 received the original request 309 from the UI 300 and forwarded the request 309 to the appropriate server, the engine 105 received original information for all of the fields 311-319. In light of an analysis of the rules 244, the engine 105 obfuscated the fields 313 and 316 but allowed the other information in the responsive traffic to remain in the selectively obfuscated traffic or message transmitted to the UI 300 (e.g., the fields 311, 312, 314, 315, and 317-319).

In some instances, a different user of the UI 300 may have a different role with different authorizations or permissions. In that case, that user may provide his or her credentials, enabling the system 100 to know the other user's identity. For this other user, different fields might be obfuscated and/or the fields 313-316 might not be obfuscated (e.g., depending on permissions in the rules specific the other user's role or to the other user in particular). Further, the same user as originally discussed with reference to FIG. 3 may access a UI for a different service and the obfuscation engine 105 may operate in a similar manner to obfuscate the same types of information as are obfuscated in the UI 300 based on the user's role and/or based on the individual user. In some embodiments, the obfuscation engine 105 may apply a different set of rules for the different service if desired.

Figure 4:
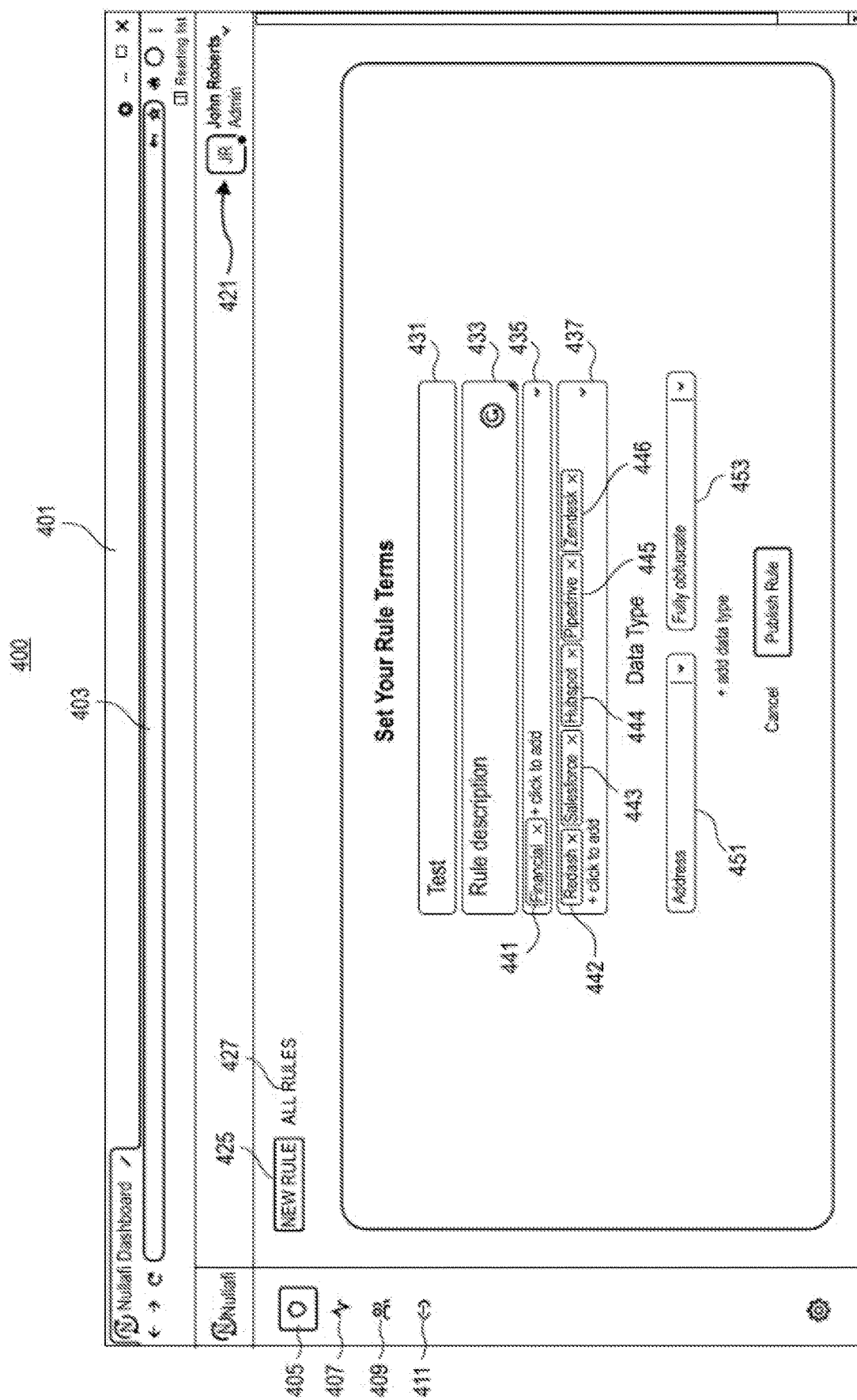
FIG. 4 depicts an example UI of the administrator tool of the example system of FIG. 1, the example UI for configuring rules for selectively obfuscating traffic.

FIG. 4 depicts an example UI 400 of the administrator tool 109 or 209 (e.g., provided via the UI components 215 of the device 215 shown in FIG. 2A) for defining the rules 244 or 224 that may be utilized to decide how to selectively obfuscate traffic received by the obfuscation engine 105 or 205. The UI 400 may be rendered via a browser application, and may include a window 401 including an address bar 403 via which a user may access the UI 400.

Figure 5:
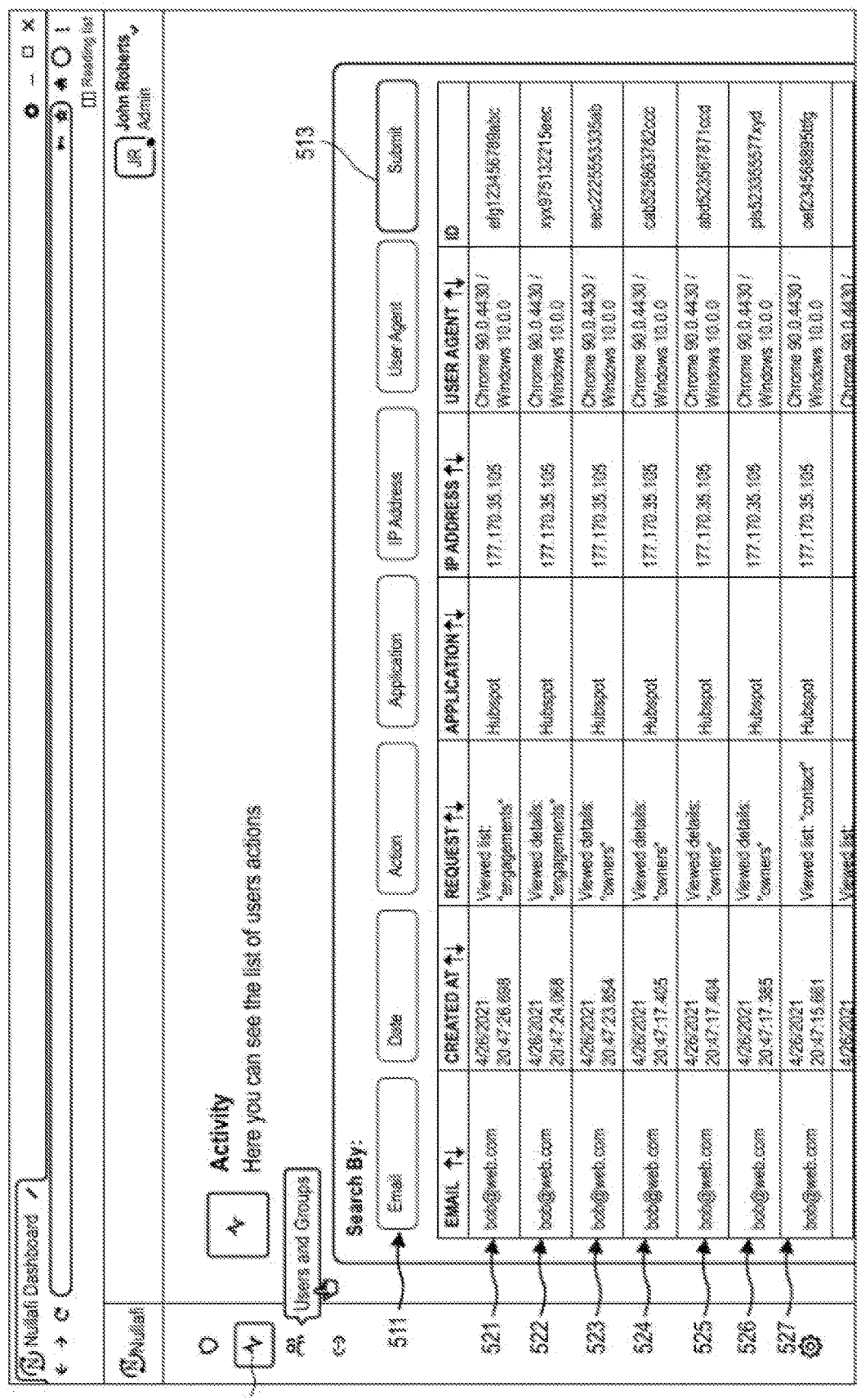
FIG. 5 depicts an example UI of the administrator tool of the example system of FIG. 1, the example UI for monitoring data activity of users.

The UI 400 may include elements 401-411, any one of which a user may interact with to view different pages or portions of the tool 109. For example, interacting with the element 405 may cause the tool 109 to display an interface for defining or changing the rules 244 (shown in FIG. 4 as the UI 400). Interacting with the element 407 may cause the tool 109 to display an interface for monitoring end-user activity (an example of which is shown in FIG. 5). Interacting with the element 409 may cause the tool 109 to display an interface for viewing users of the UIs 101 and relevant information, such as their roles, their activity, their contact information, etc. (an example of which is shown in FIG. 6). Interacting with the element 411 may cause the tool 109 to display an interface for viewing services for which the obfuscation engine 105 is configured to selectively obfuscate traffic (an example of which is shown in FIG. 7).

In any event, the UI 400 may include an element 425 that a user may interact with to define a new rule. Interacting with an element 427 may cause the UI 400 to display all active rules. When defining a rule, the UI 400 may present a field 431 for entering a name of the new rule; a field 433 for entering a description of the new rule; a field 435 for entering roles to which the new rule will apply (e.g., a "financial" role 441); a field 437 for entering services 442-446 to which the new rule will apply; a field or element 451 for specifying the type, category, or field to be obfuscated (e.g., an "address" field); and a field 453 for specifying the level of obfuscation to be applied to the type or category specified in the field 451. For example, a user may specify "fully obfuscate," "partially obfuscate" (e.g., such that so many of the first characters of the information are displayed and the rest is obfuscated); "alias;" etc. If desired, an admin may interact with an element 421 to specify various settings particular to the admin (e.g., specifying his or her own credentials, email address, etc.).

FIG. 5 depicts an example UI 500 of the administrator tool 109 or 209 (e.g., provided via the UI components 215 of the device 215 shown in FIG. 2A) for monitoring activity of users of the UIs 101. The UI 500 may include many of the same elements as those shown in FIG. 4, including the element 407.

The UI 500 may be presented in response to a user interacting with the element 407 (also shown in FIG. 4). As shown, a user can search for activity information by entering relevant information into any one or more of the fields 511 and by interacting with the element or button 513. As shown, the UI 500 may display information pertaining to users 521-527. The headers 510 specify the type of information being displayed, including email address, date the user was created, last request of the user, service or application the user interacted with, etc. In various embodiments, any suitable headers and corresponding information may be displayed.

FIG. 6 depicts an example UI 600 of the administrator tool 109 or 209 (e.g., provided via the UI components 215 of the device 215 shown in FIG. 2A) for viewing information about users of the UIs 101. The UI 600 may include many of the same elements as those shown in FIG. 4, and may be presented in response to the user interacting with the element 409 (also shown in FIG. 4) and then an element 601. The UI 600 may present within an area 620 information about users 621-626, such as username, email address, role (shown as groups in FIG. 6), browser, etc. A user may interact with an element 603 to view the roles or groups that have been defined for the system 100. If desired, the user may interact with the UI 600 to add roles or groups, add users, and manipulate which users are assigned to which roles/groups (e.g., by interacting with an element 611).

FIG. 7 depicts an example UI 700 of the administrator tool 109 or 209 (e.g., provided via the UI components 215 of the device 215 shown in FIG. 2A) for viewing and configuring which services 121 are "connected" to the system 100 such that traffic from the specified services are routed through the obfuscation engine 105. As shown, services 711-717 are "connected." The UI 700 may be presented in response to a user interaction with the element 411 (also shown in FIG. 4).

The UI 700 may list, for each connected service 711-717, a tool or service name 701, a URL 703 for accessing the tool or service, a status 705 for indicating whether or not the service is active (i.e., indicating whether or not the engine 105 is currently configured to function as an intermediary and selectively obfuscate traffic from the service; if the service is inactive, the engine 105 may avoid selectively obfuscating the traffic and may simply forward the traffic the appropriate end-user device) and an interactive element 707 for pausing or deactivating selective obfuscation for the service, for example.

FIG. 8A depicts an example method 800A for routing traffic to either its original destination or to an obfuscation engine for selective obfuscation, according to an embodiment. The method 800A may be implemented, in whole or in part, by the systems 100, 200a, or 200b shown in FIGS. 1-2B. Specifically, some or all of the method 800A may be implemented by a traffic routing tool (e.g., one of the traffic routing tools 103 or 203) and/or any suitable computing device implementing the traffic routing tool (e.g., one of the devices 210, 230, or 250) shown in FIGS. 1-2B. The method 800A may be saved to a memory as one or more instructions or routines (e.g., at one of the memories 223, 243, or 263). While components shown in FIGS. 1-7 are referenced below, it will be understood that any similar suitable component may implement the functions described below.

The method 800A begins when a request for data from a service (e.g., 121) is received (block 805). The request may be received via a UI such as the UI 300 shown in FIG. 3, which may be provided via any suitable end-user UI application (such as one of the UIs 101 or 201) and end-user device (e.g., the device 210). The requested service may be any one of the services 121 shown in FIG. 1, or any similar service. In an embodiment, the method 800A is implemented without the block 805. For example, the method 800A may be utilized to inspect traffic to the service that is not responsive to a user request. The request may be a database query for data (e.g., for one of the databases 123) that is provided by the service.

After the request is received, the traffic routing tool identifies a network address for the service (810). The network address may be a URL or an IP address assigned to the server providing the service. In an embodiment, the traffic routing tool identifies an IP address for the service by communicating with a domain name server to determine the IP address corresponding to a URL. In any event, the end-user device may implement one or more applications for interacting with a plurality of services, each of which may be provided via a different service or tool. As a result, a first request for data from a first service may be associated with a first network address and a second request for data from a second service may be associated with a second network address.

The traffic routing tool may analyze the network address and a set of rules to determine whether or not the request should be routed to an obfuscation engine (e.g., 105 or 205) (block 815). The traffic routing tool may analyze a set of rules (e.g., the rules 224) listing network addresses for services that should be routed through an obfuscation engine.

Based on the results of block 815, the traffic routing tool determines whether or not to route the request to an obfuscation engine (block 820).

When the analysis indicates that the rules do not indicate that the network address is a service associated with the obfuscation engine, the traffic routing tool routes the request to the network address in a manner that bypasses the obfuscation engine (block 825). In an embodiment, the service receiving the request may determine from the received request that the request originated from the end-user device, and may transmit responsive traffic directly to the end-user device. Alternatively, in an embodiment, the responsive traffic is routed through the server providing the obfuscation engine without the obfuscation engine processing the traffic to selectively obfuscate the traffic.

When the analysis indicates that the rules indicate that the network address is a service associated with the obfuscation engine, the traffic routing tool routes the request to the obfuscation engine (block 830). The obfuscation engine may alter or wrap the message including the request to cause the service to send responsive traffic to the obfuscation engine. That is, the request is forwarded to the service in a manner that causes the service to send responsive traffic back to the obfuscation engine rather than sending the responsive traffic directly back to the end-user device. In some embodiments, the obfuscation engine is implemented on the same device as the traffic routing tool (e.g., both may be implemented on a proxy server, wherein all employee traffic is routed from the end-user devices through the proxy server). In such an embodiment, routing the request to the obfuscation engine involves passing the request via a software handoff (i.e., without transmitting the request to a second device via a network).

In an embodiment, the request and/or message including the request is not selectively filtered when being sent from the end-user device to the service. In an embodiment, traffic is selectively obfuscated when being sent from the service to the end-user device but is not selectively obfuscated when sent from the end-user to the service. In an embodiment, traffic is selectively obfuscated when sent from the end-user device to the service. For example, the service may be prevented from accessing personal information for a user of the end-user device. In such an example, it may be desirable to obfuscate personal information (e.g., email address, name, social security number, etc.) or other suitable information so that the service does not receive the information. This may be beneficial if the personal data is not needed for the service to perform its intended function.

Figure 8B:
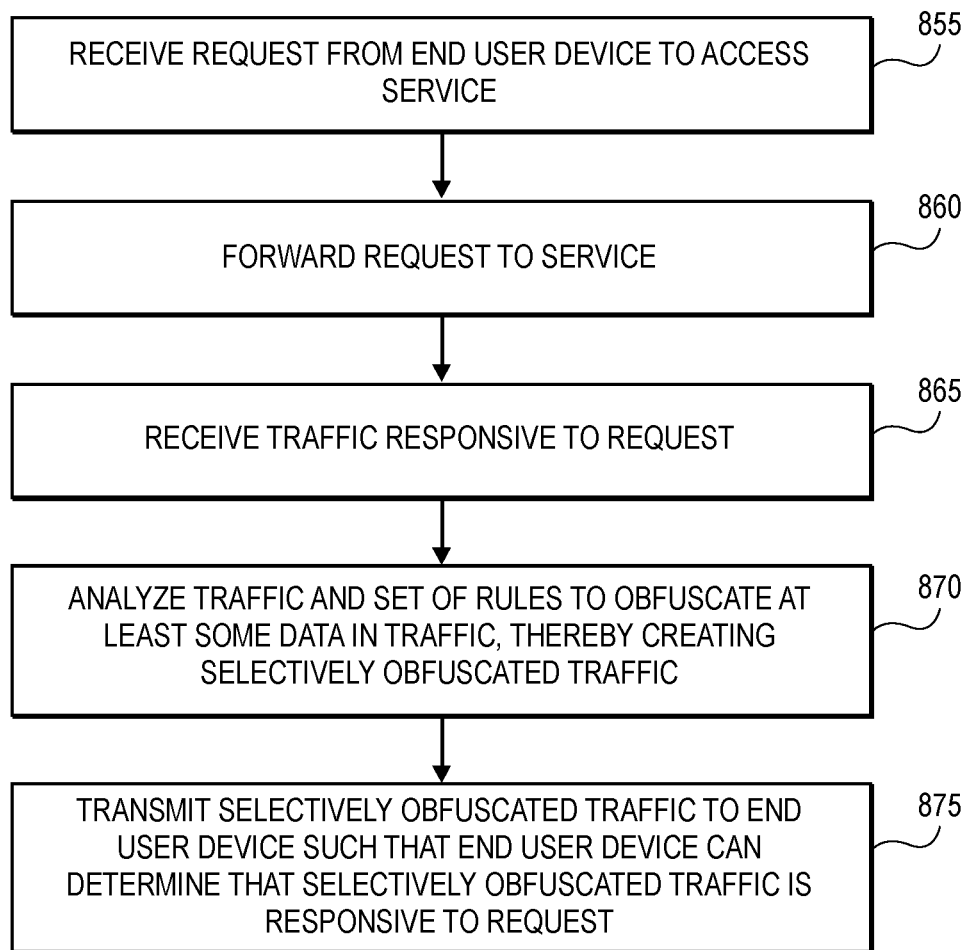
FIG. 8B is a flow diagram of an example method for implementing an obfuscation engine.

FIG. 8B depicts an example method 800B for selectively obfuscating traffic via an obfuscation engine acting as an intermediary node between a server that transmitted the traffic and an end-device that will receive the traffic. The method 800B may be implemented, in whole or in part, by the systems 100, 200a, or 200b shown in FIGS. 1-2B. Specifically, some or all of the method 800B may be implemented by an obfuscation engine (e.g., one of the obfuscation engines 105 or 205) and/or any suitable computing device implementing the traffic routing tool (e.g., the device 230) shown in FIGS. 1-2B. The method 800B may be saved to a memory as one or more instructions or routines (e.g., at one of the memories 223, 243, or 263). While components shown in FIGS. 1-7 are referenced below, it will be understood that any similar suitable component may implement the functions described below.

The method 800B begins when a request to access a service (e.g., 121) is received at an obfuscation engine (e.g., 105 or 205) from an end-user device (e.g., 210) (block 855). The request may be any suitable request for information. For example, the request may be a request for records pertaining to a customer of a company for which the user of the end-user device is an employee.

The request may be received from the traffic routing tool (e.g., 103 or 203) and the device implementing the traffic routing tool (e.g., the end-user device 210). In an embodiment, traffic routing tool and the obfuscation engine are implemented on the same device (e.g., the device 230). In such an embodiment, the traffic routing tool receives the request and determines whether or not the request should be routed through the obfuscation engine (e.g., based on whether or not the requested service is identified in the set of rules 224 as being a service for which traffic should be routed through the obfuscation engine). When the traffic routing tool determines that the request should be routed through the obfuscation engine, the traffic routing tool passes the request to the obfuscation engine. In an embodiment, the obfuscation engine receives the request from another server (e.g., the server 250) or an end-user device (e.g., 210) on which the traffic routing tool is implemented.

After receiving the request, the obfuscation engine may forward the request to the requested service (e.g., one of the services 121 or 221) which may be implemented at any suitable server (e.g., one of the servers 270) (block 860). The obfuscation engine may transit the request in a manner that causes the requested service and server to transmit responsive traffic to the obfuscation engine (e.g., 205) rather than the end-user device (e.g., 210) that transmitted the original request. In an embodiment, the obfuscation engine wraps the original request and/or message including the request in a wrapper that identifies the obfuscation engine as the transmitter in the message. In an embodiment, the obfuscation engine may obfuscate or alter data or metadata included in the original message (e.g., when such data or metadata is not necessary for carrying out the requested service). For example, the obfuscation engine may remove personal or sensitive information from the message if desired. This may help protect the end-user's sensitive information, and may help protect parties associated with the requested service (e.g., by relieving the parties from responsibilities relating to being an "information fiduciary"). In an embodiment, the original request and/or message is forwarded with little or no modification by the obfuscation engine.

The obfuscation engine may receive traffic responsive to the request (block 865). For example, staying with the example in which the request is a request for information pertaining a customer of interest, the responsive traffic may include any one or more of the following pieces of information: the customer's name, email address, home address, account balance, credit card number, phone number, date of birth, etc. The traffic may be formatted such that it includes one or more fields, each pertaining to a different one of the pieces of information (e.g., a name field, an email address field, etc.).

After receiving the traffic, the obfuscation engine may analyze the traffic and a set of rules (e.g., the rules 244) to obfuscate at least some data in the traffic, thereby creating selectively obfuscated traffic (block 870). Specifically, the set of rules may specify certain categories or fields of data (e.g., credit card information) that should be obfuscated. For example, the UI 300 shown in FIG. 3 includes fields 311-319. In the shown example, the request related to records for customers 321, 325, and 325. As shown, the obfuscation engine determined that the set of rules 244 indicates that the fields 313 and 316 should be obfuscated. The set of rules may specify that the fields or categories 313 and 316 should always be obfuscated. In an embodiment, analyzing the set of rules includes analyzing a role assigned to a user of the end-user device and permissions assigned to the roles. Example roles may include any suitable role, such as sales role, executive role, human resources (HR) role, accounting role, etc. In short, each role may need different information relating to information handled at the service. For example, accounting roles may have permission to view financial information (e.g., credit card numbers, account balances, etc.), but sales roles may not have permission to view financial information. In any event, the obfuscation engine may selectively obfuscate traffic based on the role assigned to the end-device (or user of the end-device) that will be receiving the traffic.

After selectively obfuscating the traffic, the obfuscation engine may transmit the selectively obfuscated traffic to the end-user device that originally transmitted the request (block 875). The selectively obfuscated traffic may be transmitted in a manner that enables the end-user device to determine that the traffic is responsive to the original request.

FIG. 9 depicts an example method 900 for configuring a system designed to selectively obfuscate traffic between a server and an end-user device. The method 900 may be implemented, in whole or in part, by the systems 100, 200*a*, or 200*b* shown in FIGS. 1-2B. Specifically, some or all of the method may be implemented by an administrator tool (e.g., one of the administrator tools 109 or 209) and/or any suitable computing device implementing the traffic routing tool (e.g., the device 210) shown in FIGS. 1-2B. The method 900 may be saved to a memory as one or more instructions or routines (e.g., at the memory 223). While components shown in FIGS. 1-7 are referenced below, it will be understood that any similar suitable component may implement the functions described below.

The method 900 begins when an obfuscation engine (e.g., the obfuscation engine 105) and/or a traffic routing tool (e.g., one of the tools 102) is implemented (block 905).

An administrator tool (such as the tools 109 and 209) may render a UI (e.g., at an end-user device such as the device 210) to allow user interaction (block 910). The UI may be similar to the UIs 400-700 shown in FIGS. 4-7.

The administrator tool may receive a requested change to a set of rules utilized by the obfuscation engine (e.g., 105, 205) or traffic routing tool (e.g., 103, 203) (block 915). For example, the administrator tool may receive a requested to rules stipulating when the traffic routing tool should route traffic to through the obfuscation engine for selective obfuscation. This set of rules may be or include a list of network addresses (e.g., URLs or IP addresses) for services for which traffic should be selectively obfuscated.

As another example, the requested rule may relate to the creation or permission levels for various roles. For example, a new rule may specify that a give role has permission to view a first field but not a second field of information. As another example, a user may utilize the administrator tool to specify services for which traffic should be routed through the obfuscation engine. To illustrate, the UI 700 shown in FIG. 7 enables a user to add a new tool or service by specifying a URL for the new tool or service.

In response to the requested change, the administrator tool changes the set of rules in accordance with the request (block 920). For example, the administrator tool may update the rules 244 or 227 shown in FIGS. 2A and 2B.

FIG. 10 is a flow diagram of an example method 1000 for selectively obfuscating traffic using a machine learning (ML) model. FIG. 11 illustrates an example method 1100 for training, evaluating, and using the ML model discussed with reference to FIG. 10. The methods 1000, 1100 may be implemented, in whole or in part, by the systems 100, 200*a*, or 200b shown in FIGS. 1-2B. Accordingly, the methods 1000, 1100 may be saved to a memory as one or more instructions or routines (e.g., to one or more of the memories 223, 243, 263). In particular, the ML model trained and utilized during the methods 1000, 1100 may be part of the obfuscation engine 105 or 205. In one example embodiment, the server 230 may both train and implement the ML model. In another example embodiment, a different one or more servers (not shown) may train the ML model, and transmit the trained ML model to the server 230 for implementation. For ease of explanation, the description of FIGS. 10-11 refers to the system 100 as implementing the methods 1000, 1100.

The method 1000 begins when the system 100 acquires a plurality of instances of historical traffic (i) originating from one or more servers each implementing a different service (e.g., a service of the data interaction service(s) 121, 221), and (ii) destined for one or more end-user devices (e.g., similar to the end-user device 210) (block 1002). The plurality of instances of historical traffic are training data that will be used to train a ML model. An instance of historical traffic may refer to a response transmitted by a server that is responsive to a request from an end-user device. Each instance of historical traffic includes one or more fields (i.e., data fields). The instances of traffic may include a first set of instances originating from a first server, a second set of instances originating from a second server, and so on, such that the plurality of instances includes multiple sets of instances, where each set of instances originates from a different server. Further, each server may format traffic (i.e., responses from the server and/or data within the responses from the server) differently. For example, traffic from a first server may be in an XML format, while traffic from a second server may be in a JSON format. As mentioned previously, example formats may include JSON, XML, HTML, PDF, CSV, TXT, etc.

Next, the system 100 trains a ML model using the plurality of instances of historical traffic to classify fields included in the plurality of instances into a plurality of categories of information (e.g., categories such as address, social security number, name, email address, credit card number, user identifier such as an employee identification number, phone number, etc.) (block 1004). Thus, an ML model of this disclosure is trained using historical traffic that has been transmitted from server(s) to end-user device(s), and which may have a variety of formats. Accordingly, the ML model is particularly configured for operating on server traffic, regardless of format. In contrast, generic ML models (e.g., for Natural Language Processing (NLP)) are generally trained using document-based data sets having additional context in comparison to traffic from servers, and are thus generally unsuited for analyzing traffic.

In one example, the plurality of instances of historical traffic may include: a first set of instances of historical traffic originating from a first server, the first set of instances having a first format; and a second set of instances of historical traffic originating from a second server, the second set of instances having a second format. In such an example, training the ML model may include (i) training a first version of the ML model using the first set of instances to classify fields included in the first set of instances into the plurality of categories, and (ii) training a second version of the ML model using the second set of instances to classify fields in the second set of instances into the plurality of carriers. Accordingly, the ML model may include multiple versions of the ML model, each version configured for analyzing a particular format of data. To apply the ML model, the system 100 may identify the format of received traffic, and apply the version of the ML model trained using traffic of that format. Alternatively, training the ML model may include training the ML model to recognize the format of traffic (i.e., to identify the first set of instances having the first format and the second set of instances having the second format) and to classify fields included in the first set of instances and in the second set of instances into the plurality of categories. Such an example can be extended to a plurality of sets of instances originating from different servers and having a plurality of formats.

Blocks 1002 and 1004 can collectively be referred to as a model generation procedure 1005, during which the system 100 generates a trained ML model. Additional details for blocks 1002 and 1004 are discussed with reference to FIG. 11.

After the system 100 has trained the ML model, the system 100 (e.g., the server 230) receives traffic from a server implementing a service (e.g., one of the data interaction service(s) 121, 122) (block 1006). The traffic may be responsive to a request from an end-user device. For example, a request from the end-user device 210 to one of the data interaction services 221 may be routed by the traffic routing tool 203a or 203b to the server 230, and passed by the server 230 to the data interaction service 221. The data interaction service 221 can then transmit a response to the request to the server 230, and the server 230 can receive the response (i.e., the traffic).

After receiving the traffic, the system 100 identifies a field included in the traffic that corresponds to a category of the plurality of the plurality of categories of information by applying the ML model to the traffic (block 1008). The field need not be explicitly labeled or identified within the traffic itself. For example, the traffic may include a phone number, but may not explicitly label the phone number as a phone number. Rather, the ML model is trained to identify a field as a phone number, regardless of whether the field is explicitly labeled as such.

In response to the identification at block 1008, the system 100 selects a rule (e.g., a rule of the obfuscation rules 244) corresponding to the category (block 1010). For example, the identified field may correspond to an "address" category of information. Accordingly, the system 100 selects a rule that indicates how access to addresses is to be restricted. Further, the system 100 may also identify a role linked to the end-user device (e.g., the role assigned to the end-user device or user of the end-user device) and select the rule further based on the role. Thus, using the previous example, the system 100 selects a rule that both (i) indicates how access to addresses is to be restricted, and (ii) applies to the role linked with the end-user device.

After selecting the rule, the system 100 modifies the traffic in accordance with the rule to restrict access to information in the field without restricting access to at least a portion of the traffic (block 1012). The system 100 may identify multiple fields in the traffic that correspond to fields included in the plurality of categories. If so, then the system 100 can also select rules corresponding to those categories, and modify the traffic in accordance with the rules. Only the information in the identified field(s) is modified (provided there is a rule restricting access to that field), leaving the remaining information in the traffic unmodified and accessible by the end-user device. If there are no rules for the identified category, or if a rule indicates that the information for that category is not to be modified, then the system 100 refrains from modifying the traffic.

For example, modifying the traffic may include obfuscating the information. For example, an identified field may correspond to an "address" category," and the information in the field may be "123 Main Street." Modifying the traffic may include obfuscating "123 Main Street," such that the end-user device, when it receives the traffic, will render the obfuscated information rather than the "real" information. Obfuscating the information may include, for example, replacing the information in the field with one or more symbols, such as asterisks, or replacing the information in the field with an alias. As discussed above, the alias may be generated based on the category of information and/or based on the information itself. The alias may be functional, such that if a user of the end-user device utilizes the alias to address a telecommunication (e.g., in the case of a phone number or email alias), the telecommunication will reach the recipient as if the user utilized the "real" information. As another example, modifying the traffic may include removing the information from the field.

After determining all applicable rules and modifying the traffic in accordance with the applicable rules, the system 100 transmits the modified traffic to the end-user device (block 1014).

The blocks 1006, 1008, 1010, 1012, and 1014 can be referred to as a model utilization procedure 1015, during which the system 100 utilizes the trained ML model that was generated during the model generation procedure 1005. In some embodiments, a first server (e.g., a server not shown in FIGS. 1-2B) may implement a training engine configured to perform the model generation procedure 1005, and a second server (e.g., the server 230) may implement an obfuscation engine (e.g., the obfuscation engine 105, 205) configured to perform the model utilization procedure 1015. The first server can transmit the trained ML model to the second server (e.g., via the network 199, 299). In some embodiments, the same server (or group of servers) may implement both the training engine and the obfuscation engine.

Turning to FIG. 11, at a high level, the method 1100 includes model design and preparation (block 1102), model training and evaluation (block 1104), and model deployment (block 1106). The block 1102 and the block 1104 may be included in blocks 1002 and 1004, respectively. The block 1106 may be included in the model utilization procedure 1015.

Generally speaking, machine learning refers to methods of data analysis that automate analytical model building. Specifically, machine learning generally refers to the algorithms and models that computer systems use to effectively perform a specific task without using explicit instructions, relying on patterns and inference instead. While traditional programs may be thought of as producing a set of outputs based upon specifically designed logic (e.g., embodied by the routines or instructions of the program) to produce a set of outputs, the process of developing machine-learning models may be thought of as producing logic based upon observed relationships between inputs and corresponding known outputs.

Machine learning algorithms learn through a process called induction or inductive learning. Induction is a reasoning process that makes generalizations (a model) from specific information (training data—i.e., data including inputs and corresponding known outputs). Generalization is required because models prepared by a machine-learning algorithm, such as the ML models discussed with reference to FIGS. 10-11, need to make predictions or decisions based upon specific data instances that were not seen during training (i.e., instances including inputs without corresponding known outputs).

Depending on the implementation, the system 100 may implement supervised learning, unsupervised learning, or semi-unsupervised learning when developing the ML model(s) of this disclosure. Supervised learning is a learning process for generalizing on problems where a prediction is required. A "teaching process" compares predictions by the model to known answers (labeled data) and makes corrections in the model. In the context of this disclosure, training data may be labeled according to which categories are included in the historical traffic and which fields in the historical traffic correspond to those categories. Unsupervised learning is a learning process for generalizing the underlying structure or distribution in unlabeled data. During unsupervised learning, natural structures are identified and exploited for related instances to each other. Semi-supervised learning can use a mixture of supervised and unsupervised techniques. This learning process discovers and learns the structure in the input variables, where typically some of the input data is labeled, and most is unlabeled. The training operations discussed herein may rely on any one or more of supervised, unsupervised, or semi-supervised learning with regard to the training data, depending on the embodiment.

The block 1102 may include any one or more steps or sub-steps 1124 and 1128, which may be implemented in any suitable order. At the step 1124, the system 100 receives training data, which includes a plurality of instances of historical traffic. The training data may be the training data referenced above with reference to block 1002. The plurality of instances of historical traffic may include: (i) a first set of instances of traffic from a first server, the first set of instances having a first format; (ii) a second set of instances of traffic from a second server, the second set of instances having a second format; . . . ; (n) an $n^{th}$ set of traffic from an $n^{th}$ server, the $n^{th}$ set of instances having an $n^{th}$ format. At least a portion of the training data may be labeled to identify fields in the historical traffic that correspond to a plurality of categories of information. In particular, at least a portion the training data may be labeled with the categories of information that the trained ML model should identify.

At the step 1126, the system 100 receives test/validation data for testing the ML model. In short, the test data is utilized to verify that the ML model is capable of generating reliable predictions. For example, the test data may include a second plurality of instances of historical traffic.

The system 100 may develop the ML model at the block 1104, which may include any one or more steps or sub-steps 1142-1146. In a typical example, at the step 1142, the system 100 trains the ML model using the training data described above. At the step 1144, the system 100 evaluates the developed ML model, and at step 1146, the system 100 determines whether or not the developed ML model is ready for deployment before either proceeding to the block 1106 or returning to the step 1142 to further develop, test, or validate the ML model.

Regarding the sub-step 1142 of block the 1104, developing the ML model typically involves the system 100 training the ML model using training data. At a high level, machine-learning models are often utilized to discover relationships between various observable features (e.g., between predictor features [observable characteristics of an instance of traffic, in this example] and target features [categories of fields included in an instance of traffic, in this example]) in a training dataset, which can then be applied to an input dataset to predict unknown values for one or more of these features given the known values for the remaining features. These relationships are discovered by feeding the ML model training data including instances each having one or more predictor feature values and one or more target feature values. The ML model then "learns" an algorithm capable of calculating or predicting the target feature values (e.g., the category corresponding to a field) given the predictor feature values (e.g., observable characteristics of an instance of traffic).

Regarding the sub-step 1144 of the block 1104, evaluating the ML model typically involves testing the ML model using testing data or validating the ML model using validation data. Testing/validation data typically includes both predictor feature values and target feature values, enabling comparison of target feature values predicted by the ML model to the actual target feature values, enabling one to evaluate the performance of the ML model. This testing/validation process is valuable because the ML model, when implemented, will generate target feature values for future input data that may not be easily checked or validated. Thus, it is advantageous to check one or more accuracy metrics of the model on data for which you already know the target answer (e.g., testing data or validation data), and use this assessment as a proxy for predictive accuracy on future data. Example accuracy metrics include key performance indicators, comparisons between historical trends and predictions of results, cross-validation with subject matter experts, comparisons between predicted results and actual results, etc.

Regarding the sub-step 1146 of the block 1104, the system 100 may utilize any suitable set of metrics to determine whether or not to proceed to the block 1106 for model deployment. Generally speaking, the decision to proceed to the block 1106 or to return to the step 1142 will depend on one or more accuracy metrics generated during evaluation (the step 1144). After the sub-steps 1142-1146 of the block 1104 have been completed, the system 100 may implement the block 1106.

The block 1106 may include any one or more steps or sub-steps 1162-1166, which may be implemented in any suitable order. The block 1106 may be included in the model utilization procedure 1015 (e.g., a sub-step 1162 may be included in the block 1006 and the sub-steps 1164-1166 may be included in the block 1008). In a typical example, the system 100 collects input data (e.g., an instance of traffic from a server) (step 1162), applies the ML model to the input data (step 1164), and outputs a classification of the fields included in the traffic (i.e., whether any fields included in the instance of traffic correspond to a category of a plurality of categories of information) (step 1166).

Note, the method 1100 may be implemented in any desired order and may be at least partially iterative. That is, the block 1102 may be implemented after the block 1104 or after the block 1106 (e.g., to collect new data for training, testing, or validation), and the block 1104 may be implemented after the block 1106 (e.g., to further improve the ML model via training or other development after deployment).

When implemented in software, any of the applications, services, and engines described herein may be stored in any tangible, non-transitory computer readable memory such as on a magnetic disk, a laser disk, solid state memory device, molecular memory storage device, or other storage medium, in a random-access memory (RAM) or read-only memory (ROM) of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Each of the described methods may be embodied by a set of circuits that are permanently or semi-permanently configured (e.g., an application-specific integrated circuit (ASIC) or field programmable gate array (FPGA)) to perform logical functions of the respective method or that are at least temporarily configured (e.g., one or more processors and a set instructions or routines, representing the logical functions, saved to a memory) to perform the logical functions of the respective method.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

What is claimed is:

1. A method for configuring a system that selectively obfuscates data transmitted between servers and end-user devices, the method comprising:
   implementing a proxy server that is configured to operate as an intermediary node between one or more servers and an end-user device requesting access to a service from a first server from the one or more servers, wherein the proxy server is configured to implement an obfuscation engine to selectively obfuscate at least some data included in traffic sent from the first server to the end-user device based on a first set of rules specifying one or more categories of data to be obfuscated;
   rendering, at a computing device, a user interface for an administrator tool;
   receiving, via the user interface, a requested change to the first set of rules;
   transmitting the requested change to the proxy server to cause the proxy server to generate an updated set of rules in accordance with the requested change and to change a manner in which the obfuscation engine at the proxy server selectively obfuscates the traffic from the first server to the end-user device;
   receiving a requested change to a second set of rules that stipulates whether traffic transmitted to a second server of the one or more servers is either: (i) routed to the proxy server to enable the proxy server to intercept the traffic, or (ii) routed to the second server in a manner that bypasses the proxy server; and
   transmitting, to the end-user device, the requested change to the second set of rules to cause the end-user device to update the second set of rules in accordance with the requested change.

2. The method of claim 1, wherein the requested change is a modification of the one or more categories of data to be obfuscated.

3. The method of claim 2, wherein the obfuscation engine is configured to apply a different set of rules depending on which of a plurality of roles is linked to the end-user device, wherein the modification applies only to a particular set of rules corresponding to a particular role linked to the end-user device.

4. The method of claim 1, wherein the requested change is a modification to which of the one or more servers the proxy server should intercept traffic from.

5. The method of claim 1, wherein the requested change indicates that the proxy server should obfuscate values for a given category of data by generating aliases corresponding to the values.

6. The method of claim 1, wherein one or more categories includes any one or more of: an address, a social security number, a name, or an email address.

7. A method for configuring a system that selectively obfuscates data transmitted between servers and end-user devices, the method comprising:
   implementing a proxy serve that is configured to operate as an intermediary node between one or more servers and an end-user device requesting access to a service from a first server from the one or more servers, wherein the proxy server is configured to implement an obfuscation engine to selectively obfuscate at least some data included in traffic sent from the first server to the end-user device based on a first set of rules specifying one or more categories of data to be obfuscated;
   rendering, at a computing device, a user interface for an administrator tool;
   receiving, via the user interface, a requested change to the first set of rules;
   transmitting the requested change to the proxy server to cause the proxy server to generate an updated set of rules in accordance with the requested change and to change a manner in which the obfuscation engine at the proxy server selectively obfuscates the traffic from the first server to the end-user device;
   receiving a requested change to a second set of rules that stipulates whether traffic transmitted from a second server of the one or more servers should be: (i) analyzed by the obfuscation engine to determine whether or not the traffic includes any fields that should be obfuscated according to the second set of rules; or (ii) forwarded to the end-user device without analyzing the traffic for fields to be obfuscated; and
   updating the second set of rules, at the proxy server, in accordance with the requested change.

8. A computing device for configuring a system that selectively obfuscates data transmitted between servers and end-user devices, the computing device comprising:
   a communication interface configured to communicatively couple to a proxy server that is configured to intercept traffic between one or more servers and an end-user device requesting access to a service from a first server from the one or more servers;
   one or more processors communicatively coupled to the communication interface; and
   one or more memories communicatively coupled to the one or more processors, the one or more memories storing instructions that, when executed, cause the one or more processors to:
   (i) render a user interface for an administrator tool;
   (ii) receive, via the user interface, a requested change to a set of rules utilized by an obfuscation engine implemented at the proxy server to selectively obfuscate at least some data included in traffic sent from the first server to the end-user device, wherein the set of rules specifies one or more categories of data to be obfuscated by the obfuscation engine;
   (iii) transmit the requested change to the proxy server to cause the proxy server to generate an updated set of rules in accordance with the requested change and to change a manner in which the obfuscation engine at the proxy server selectively obfuscates the traffic from the first server to the end-user device;
   (iv) receive, via the user interface, a requested change to a second set of rules that stipulates whether traffic transmitted to a second server of the one or more servers is either: (a) routed to the proxy server to enable the proxy server to intercept the traffic, or (b) routed to the second server in a manner that bypasses the proxy server; and (v) transmit, to the end-user device, the requested change to the second set of rules to cause the end-user device to update the second set of rules in accordance with the requested change.

9. The computing device of claim 8, wherein the requested change is a modification of the one or more categories of data to be obfuscated.

10. The computing device of claim 9, wherein the obfuscation engine is configured to apply a different set of rules depending on which of a plurality of roles is linked to the end-user device, wherein the modification applies only to a particular set of rules corresponding to a particular role linked to the end-user device.

11. The computing device of claim 8, wherein the requested change is a modification to which of the one or more servers the proxy server should intercept traffic from.

12. The computing device of claim 8, wherein the requested change indicates that the proxy server should obfuscate values for a given category of data by generating aliases corresponding to the values.

13. A selective obfuscation system, the system comprising:
one or more servers configured to provide one or more services, each se server configured to provide a different service;
an end-user device configured to request access to the one or more services;
a proxy server configured to intercept traffic between at least one of the one or more servers and the end-user device and to implement an obfuscation engine to selectively obfuscate at least some data included in traffic sent from the at least one server to the end-user device based on a set of rules specifying one or more categories of data to be obfuscated; and
a computing device comprising (a) one or more processors and (b) one or more memories communicatively coupled to the one or more processors, the one or more memories storing instructions that, when executed, cause the computing device to: (i) render a user interface for an administrator tool; (ii) receive, via the user interface, a requested change to the set of rules; (iii) transmit the requested change to the proxy server to cause the proxy server to generate an updated set of rules in accordance with the requested change and to change a manner in which the obfuscation engine at the proxy server selectively obfuscates the traffic from the at least one server to the end-user device; (iv) receive a requested change to a second set of rules that stipulates whether traffic transmitted to a second server of the one or more servers is either: (a) routed to the proxy server to enable the proxy server to intercept the traffic, or (b) routed to the second server in a manner that bypasses the proxy server; and (v) transmit, to the end-user device, the requested change to the second set of rules to cause the end-user device to update the second set of rules in accordance with the requested change.

14. The system of claim 13, wherein the requested change is a modification of the one or more categories of data to be obfuscated.

15. The system of claim 14, wherein the obfuscation engine is configured to apply a different set of rules depending on which of a plurality of roles is linked to the end-user device, wherein the modification applies only to a particular set of rules corresponding to a particular role linked to the end-user device.

16. The system of claim 13, wherein the requested change is a modification to which of the one or more servers the proxy server should intercept traffic from.

17. The system of claim 13, wherein the requested change indicates that the proxy server should obfuscate values for a given category of data by generating aliases corresponding to the values.

18. A selective obfuscation system, the system comprising:
one or more servers configured to provide one or more services, each se server configured to provide a different service;
an end-user device configured to request access to the one or more services;
a proxy server configured to intercept traffic between at least one of the one or more servers and the end-user device and to implement an obfuscation engine to selectively obfuscate at least some data included in traffic sent from the at least one server to the end-user device based on a set of rules specifying one or more categories of data to be obfuscated; and
computing device comprising (a) one or more processors and (b) one or more memories communicatively coupled to the one or more processors, the one or more memories storing instructions that, when executed, cause the computing device to: (i) render a user interface for an administrator tool; (ii) receive, via the user interface, a requested change to the set of rules; (iii) transmit the requested change to the proxy server to cause the proxy server to generate an updated set of rules in accordance with the requested change and to change a manner in which the obfuscation engine at the proxy server selectively obfuscates the traffic from the at least one server to the end-user device; (iv) receive a requested change to a second set of rules that stipulates whether traffic transmitted from a second server of the one or more servers should be: (a) analyzed by the obfuscation engine to determine whether or not the traffic includes any fields that should be obfuscated according to the second set of rules; or (b) forwarded to the end-user device without analyzing the traffic for fields to be obfuscated; and (v) update the second set of rules, at the proxy server, in accordance with the requested change.

19. A computing device for configuring a system that selectively obfuscates data transmitted between servers and end-user devices, the computing device comprising:
a communication interface configured to communicatively couple to a proxy server that is configured to intercept traffic between one or more servers and an end-user device requesting access to a service from a first server from the one or more servers;
one or more processors communicatively coupled to the communication interface; and
one or more memories communicatively coupled to the one or more processors, the one or more memories storing instructions that, when executed, cause the one or more processors to:
(i) render a user interface for an administrator tool;
(ii) receive, via the user interface, a requested change to a set of rules utilized by an obfuscation engine implemented at the proxy server to selectively obfuscate at least some data included in traffic sent from the first server to the end-user device, wherein the set of rules specifies one or more categories of data to be obfuscated by the obfuscation engine;

(iii) transmit the requested change to the proxy server to cause the proxy server to generate an updated set of rules in accordance with the requested change and to change a manner in which the obfuscation engine at the proxy server selectively obfuscates the traffic from the first server to the end-user device;

(iv) receive, via the user interface, a requested change to a second set of rules that stipulates whether traffic transmitted from a second server of the one or more servers should be: (a) analyzed by the obfuscation engine to determine whether or not the traffic includes any fields that should be obfuscated according to the second set of rules; or (b) forwarded to the end-user device without analyzing the traffic for fields to be obfuscated; and (v) update the second set of rules, at the proxy server, in accordance with the requested change.

* * * * *